US008261657B2

(12) United States Patent
Serra et al.

(10) Patent No.: US 8,261,657 B2
(45) Date of Patent: Sep. 11, 2012

(54) PRESS AND GRILL

(75) Inventors: Daniel Serra, Richmond (AU); Richard Hoare, Lane Cove (AU)

(73) Assignee: Breville Pty Limited, Botany, New South Wales (AU)

( * ) Notice: Subject to any disclaimer, the term of this patent is extended or adjusted under 35 U.S.C. 154(b) by 632 days.

(21) Appl. No.: 12/540,369

(22) Filed: Aug. 13, 2009

(65) Prior Publication Data

US 2009/0320695 A1    Dec. 31, 2009

Related U.S. Application Data

(62) Division of application No. 10/575,846, filed on Apr. 14, 2006, now Pat. No. 7,717,028.

(51) Int. Cl.
*A47J 37/06* (2006.01)
(52) U.S. Cl. ........................................... 99/380; 99/381
(58) Field of Classification Search .................... 99/380, 99/381–384, 339–372
See application file for complete search history.

(56) References Cited

U.S. PATENT DOCUMENTS

| | | | | |
|---|---|---|---|---|
| 3,998,145 A | * | 12/1976 | Maisch | 99/339 |
| 4,178,500 A | * | 12/1979 | Brindopke | 219/524 |
| 4,987,827 A | * | 1/1991 | Marquez | 99/331 |
| 5,044,264 A | * | 9/1991 | Forney | 99/349 |
| 5,417,151 A | * | 5/1995 | Ambler | 99/450 |
| 5,762,968 A | * | 6/1998 | Swaidner et al. | 425/96 |
| 5,992,302 A | * | 11/1999 | Geisler | 99/343 |
| 6,433,312 B1 | * | 8/2002 | Chen | 219/386 |
| 7,301,128 B2 | * | 11/2007 | Li et al. | 219/450.1 |
| 7,510,469 B2 | * | 3/2009 | Park | 454/155 |
| 7,717,028 B2 | * | 5/2010 | Serra | 99/339 |

\* cited by examiner

*Primary Examiner* — Daniel L Robinson
(74) *Attorney, Agent, or Firm* — Molins & Co.

(57) ABSTRACT

There is provided a toaster grill having a lower housing that supports a lower cooking surface and an upper housing that supports an upper cooking surface. The upper housing pivots with respect to a "U" shaped frame that is hinged with respect to the lower cooking surface. A locking hinge allows the pivoting motion of the frame to be automatically arrested in an intermediate orientation between the fully closed and fully open grill orientations. The locking hinge automatically resets when the upper housing is rotated from the fully open grill orientation to the fully closed orientation.

17 Claims, 28 Drawing Sheets

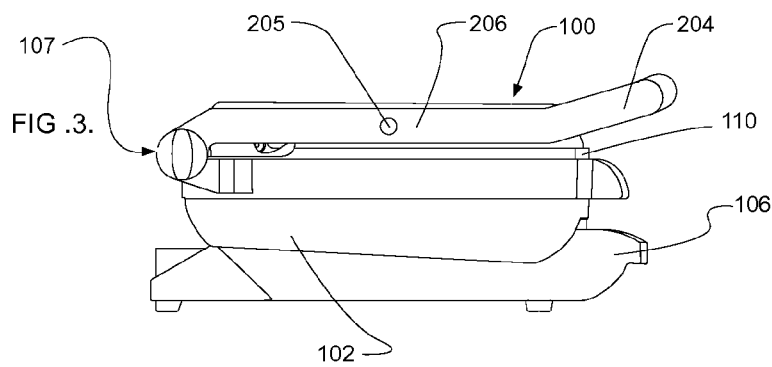
FIG. 3.
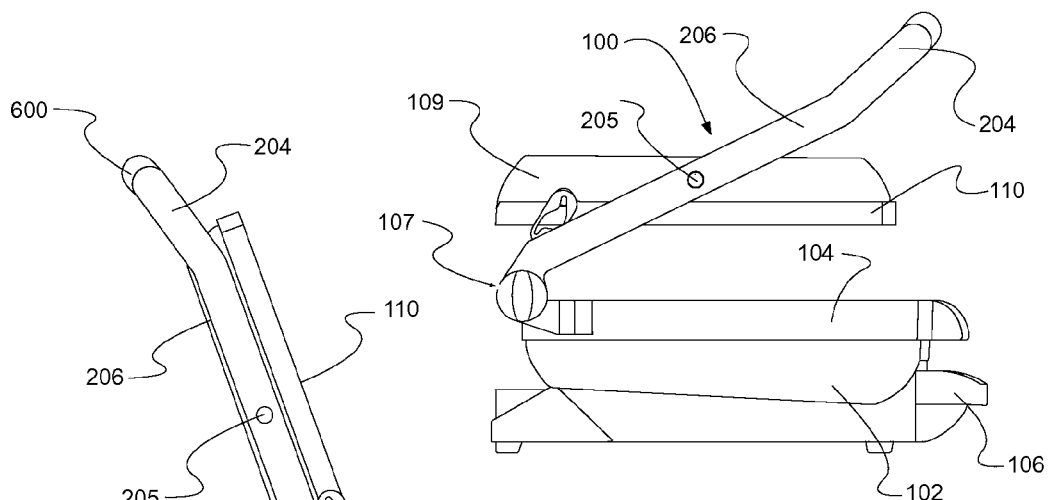
FIG. 4.
FIG. 5.
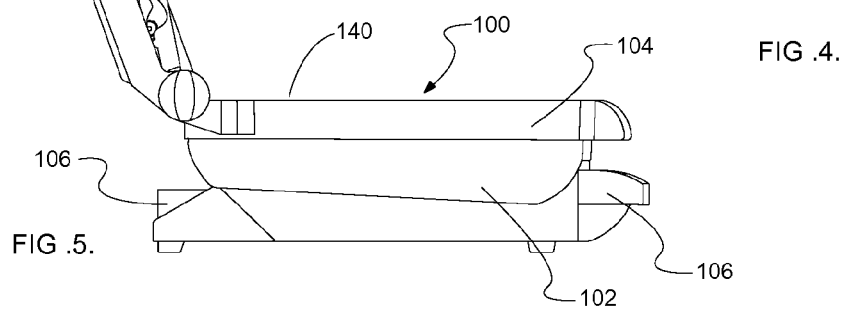
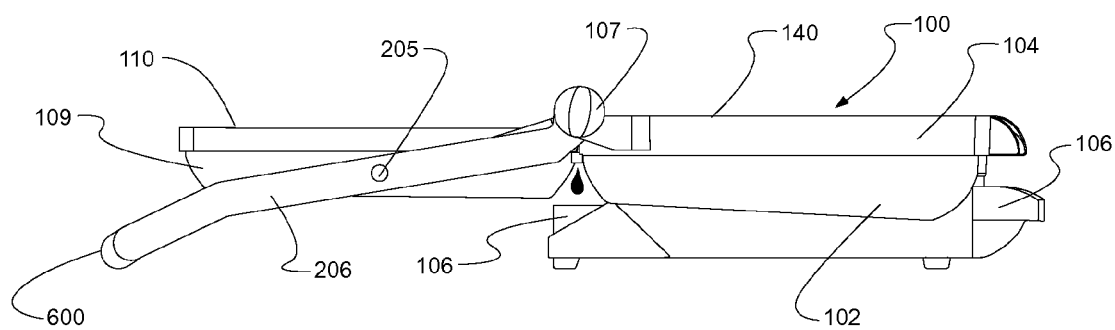
FIG. 6.

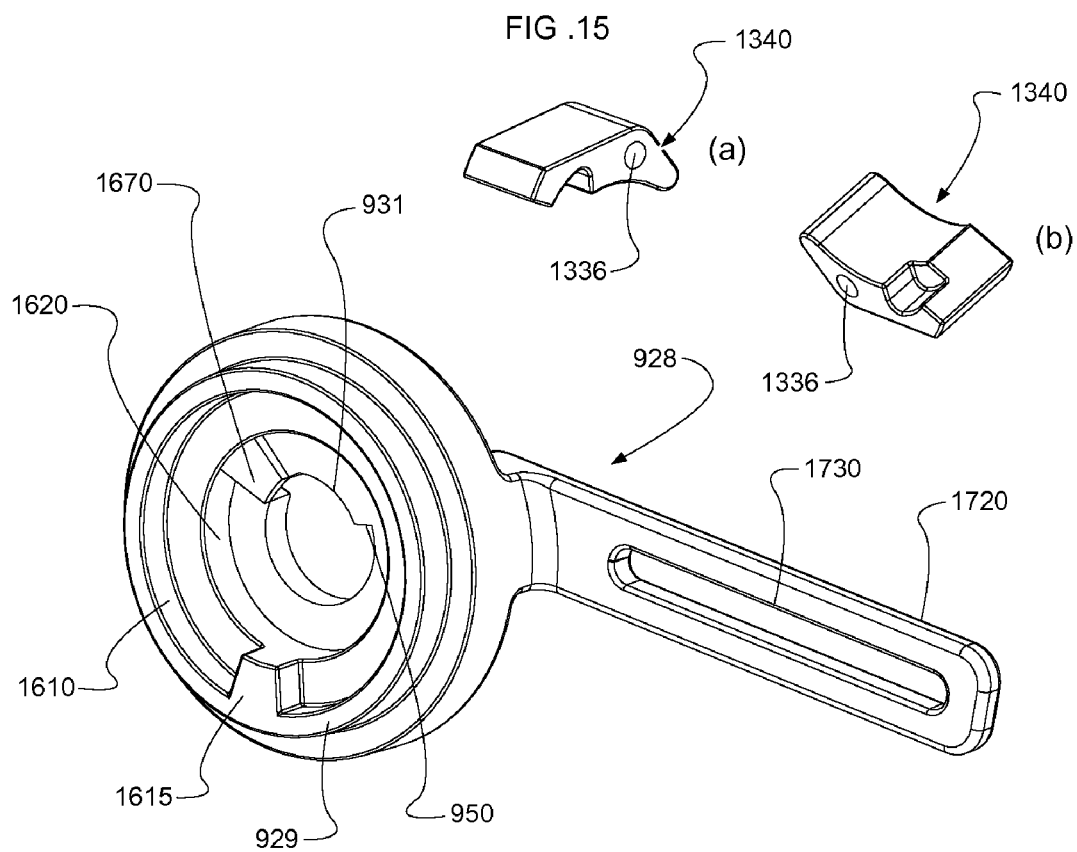
FIG. 15
FIG. 16
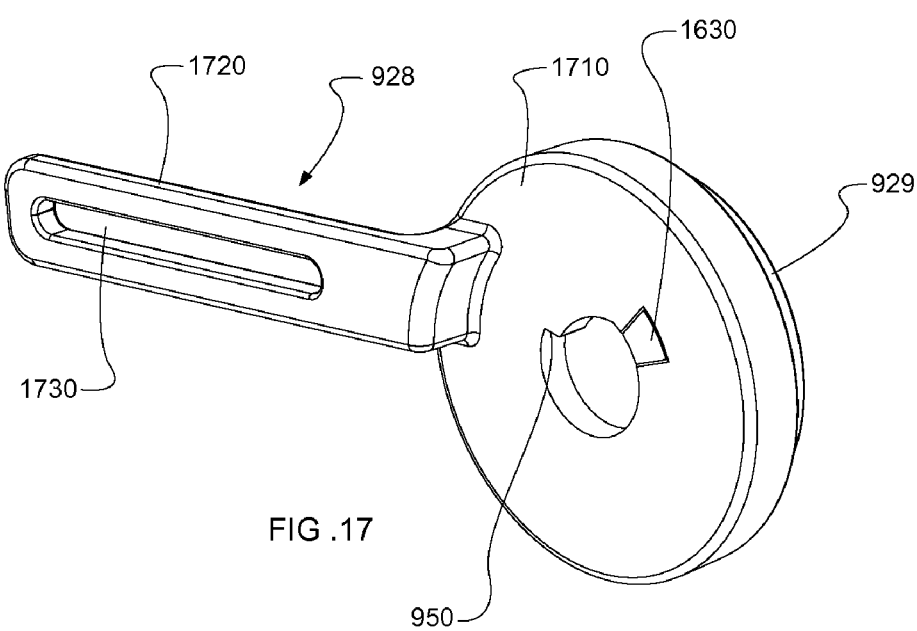
FIG. 17

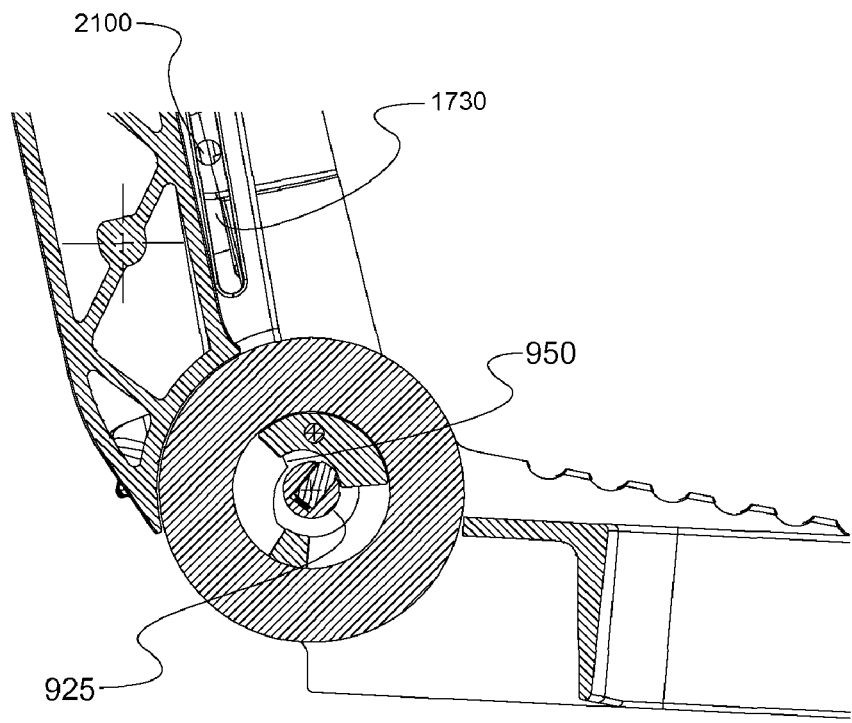
SECTION G-G  FIG. 24
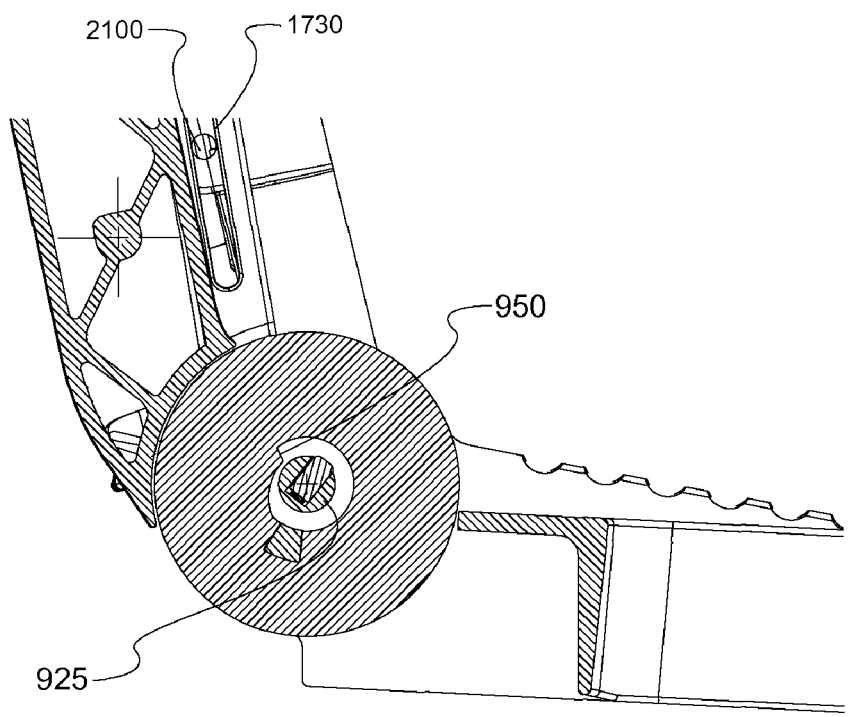
FIG. 25

PRESS AND GRILL

FIELD OF THE INVENTION

The invention pertains to toaster grills and more particularly to a toaster grill that can safely assume a variety of cooking orientations and functions including a fully open grill orientation.

BACKGROUND OF THE INVENTION

A sandwich press has a lower housing that supports a lower cooking surface. The upper cooking surface is carried by an upper housing that pivots about a "U" shaped frame. The "U" shaped frame further comprises a transverse handle that allows the user to raise and lower the upper housing. In a typical sandwich press, the upper and lower cooking surfaces are flat.

Similar configurations are used in electric grills. The operating temperature of an electric grill is higher than that of a typical sandwich press. In these types of grills, both the top the upper and lower cooking surfaces include parallel ribs which provide cooked meat with characteristic sear marks and also promote the run off of cooking juices. However, neither prior art sandwich presses nor prior art meat grills are known to have sandwich press as well as grill functions, providing a fully open grill orientation in which both cooking surfaces are facing upward, generally co-planar and horizontal.

OBJECTS AND SUMMARY OF THE INVENTION

It is an object to provide a combination sandwich press and grill comprising upper and lower housings and upper and lower cooking surfaces. The upper and lower cooking surfaces can assume a fully open grill orientation. In the fully opened grill orientation, the upper and lower cooking surfaces face upward, are generally co-planar and horizontal.

In other embodiments of the device, the lower cooking surface is tilt adjustable.

In yet other embodiments of the device, the orientation of the upper housing and upper cooking surface orientations controlled by a user operated locking hinge.

In particularly preferred embodiments, a track arm is used to control the movement of the tilting upper housing, particularly in the intermediate and fully open grill orientations.

In other embodiments of the invention, a full length drip tray collects run off from both the upper and lower cooking surfaces when the toaster grill is in the fully open grill orientation.

Provided is a hinge locking assembly that enables hinged components to have a closed orientation, a fully open orientation and an intermediate and locked orientation. The assembly comprises a lock barrel having a central opening into which extends a lock shaft. The lock shaft is rotatable, by a user, from a locked to an unlocked position. The lock shaft supports a spring biased cam pin and a spring biased reset pin. The barrel supports a pivoting toggle, the toggle having a head and a tail. The cam pin impinges on the head of the toggle when the lock shaft is in the locked position and on the tail of the toggle when the lock shaft is in the unlocked position. The assembly further comprising a shroud that conceals the lock barrel and lock shaft and rotates from the closed orientation to the fully open orientation, the shroud having an internal tooth that interferes with the head of the toggle in the intermediate and locked orientation. Movement of the shroud from the fully open orientation to the closed orientation causes contact with the reset pin and consequently a rotation of the lock shaft into its locked position.

Also provided is a combination sandwich press and grill device having a lower housing and an upper housing at is carried by a "U" shaped frame, the lower housing having a lower cooking surface. The lower cooking surface is tilt adjustable and controlled by an actuator located on the exterior of the lower housing, the actuator coupled to a forward portion of the lower cooking surface.

Disclosed is a combination sandwich press and grill device having a lower housing with a lower cooking surface and an upper housing with an upper cooking surface where the lower housing receives a removable drip tray that collects drippings from the upper cooking surface when the device is in a fully open orientation.

Also provided is a combination sandwich press and grill device having a lower housing with a lower cooking surface and an upper housing with an upper cooking surface, the upper and lower housings being interconnected by a hinge, where the upper housing has a closed orientation, a fully open orientation and an intermediate and locked orientation, the device positionable into the fully open orientation only upon activation of a hinge locking mechanism that is carried by the hinge that interconnects the upper and lower housings.

In some embodiments of the device, the upper cooking surface is provided with ribs and the lower cooking surface is flat.

In particular embodiments of this sort, the ribs are tapered. In particularly preferred embodiments, a single variable thermostat is used to control the temperature of the lower cooking surface and a fixed thermostat is used to establish the temperature of the upper cooking surface.

Accordingly, there is provided a toaster grill having a lower housing that supports a lower cooking surface and an upper housing that supports an upper cooking surface. The upper housing pivots with respect to a "U" shaped frame that is hinged with respect to the lower cooking surface. A locking hinge allows the pivoting motion of the frame to be automatically arrested in an intermediate orientation between the fully closed and fully open grill orientations. The locking hinge automatically resets when the upper housing is rotated from the fully open grill orientation to the fully closed orientation.

BRIEF DESCRIPTION THE DRAWING FIGURES

FIGS. 3-6 are side elevations illustrating different orientations of the upper housing and upper cooking surface;

Figure 18:
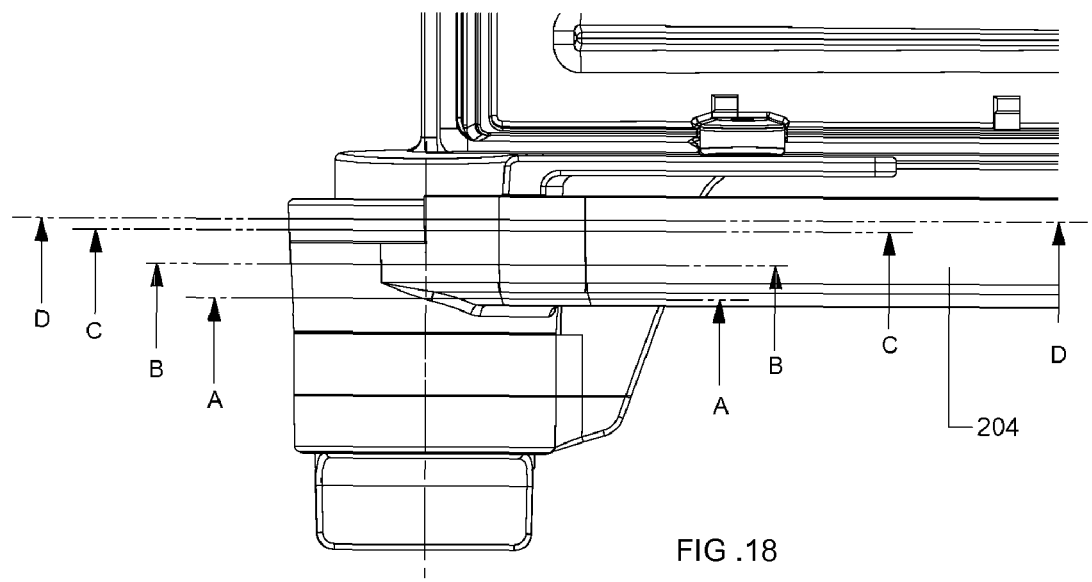
Figure 38:
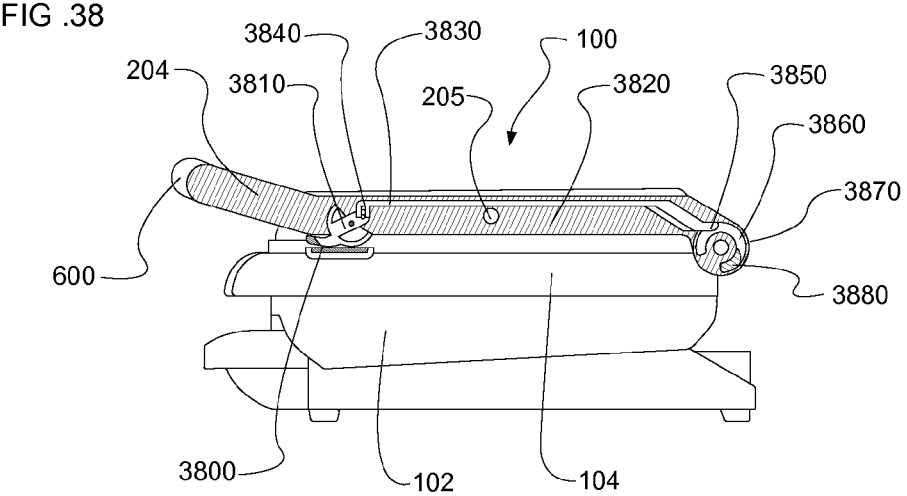
Figure 39:
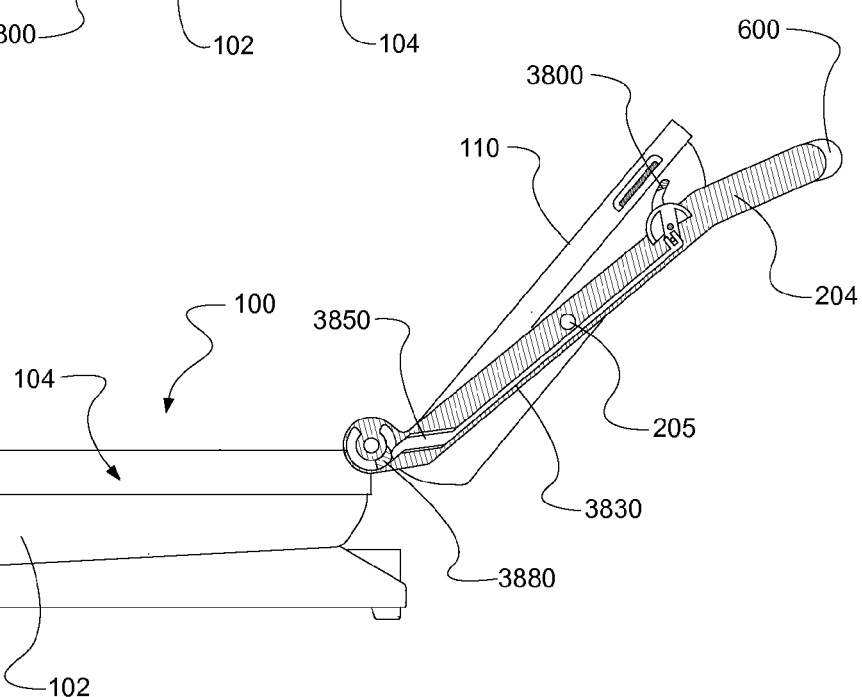
Figure 40:
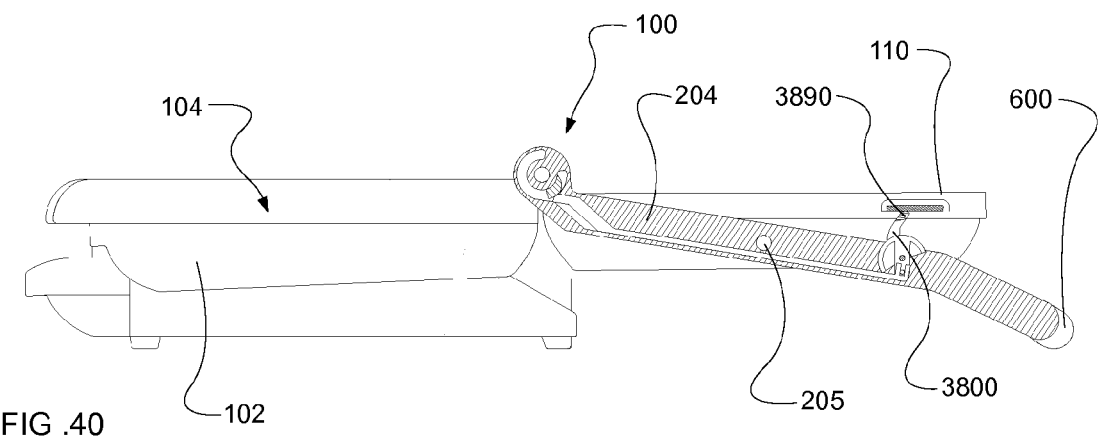
Figure 41:
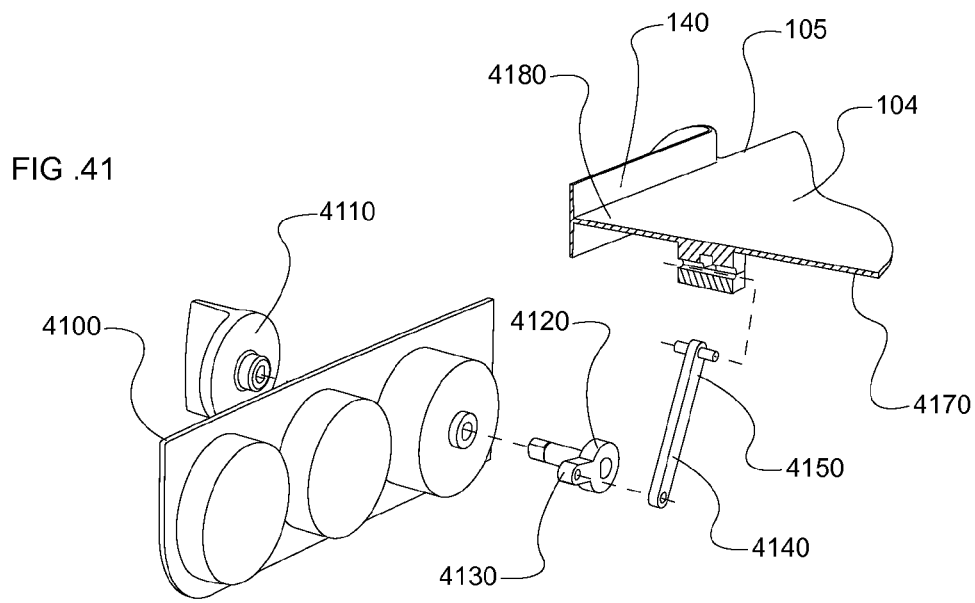
Figure 42:
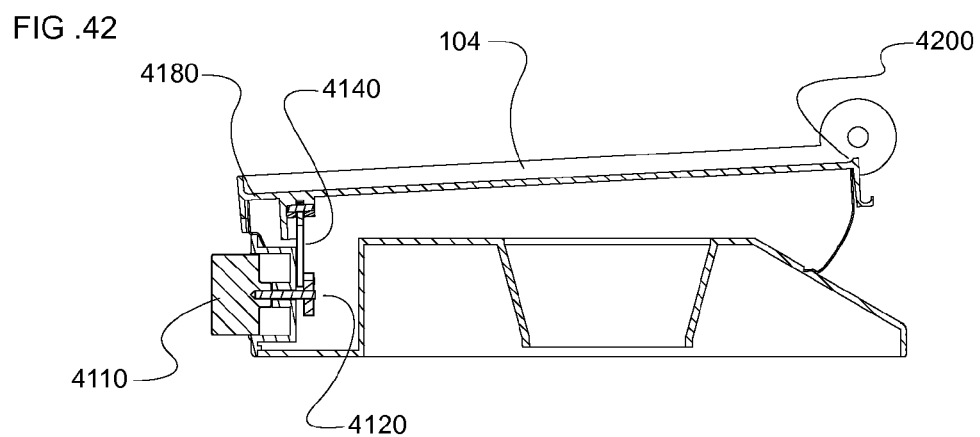
Figure 43:
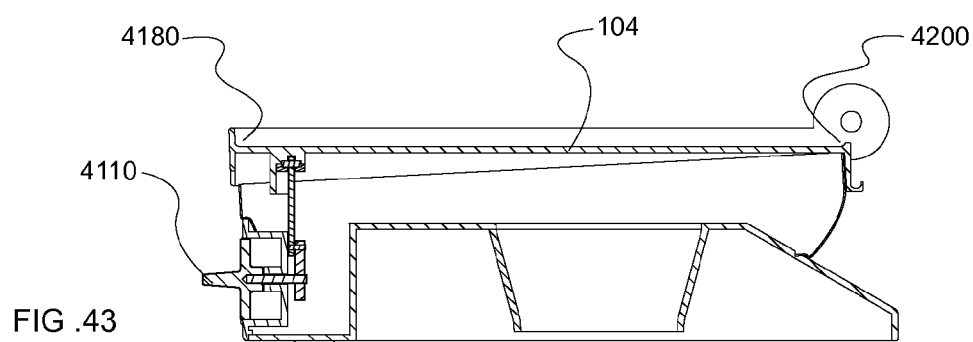
Figure 44:
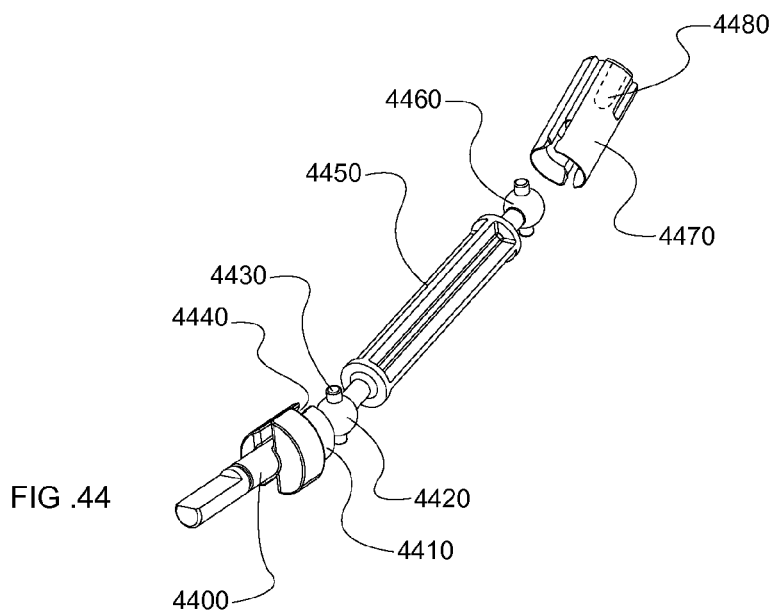
Figure 45:
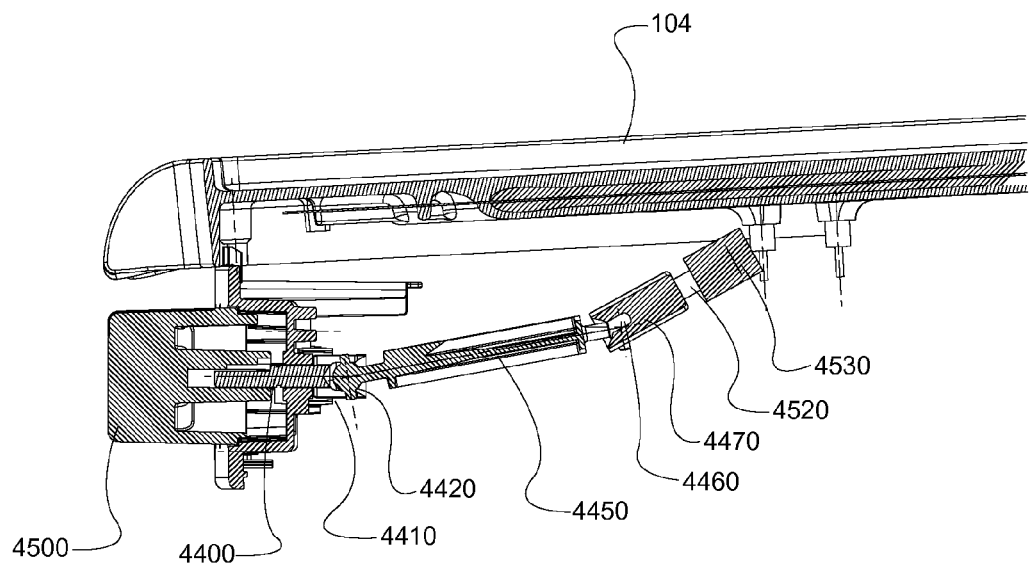
Figure 46:
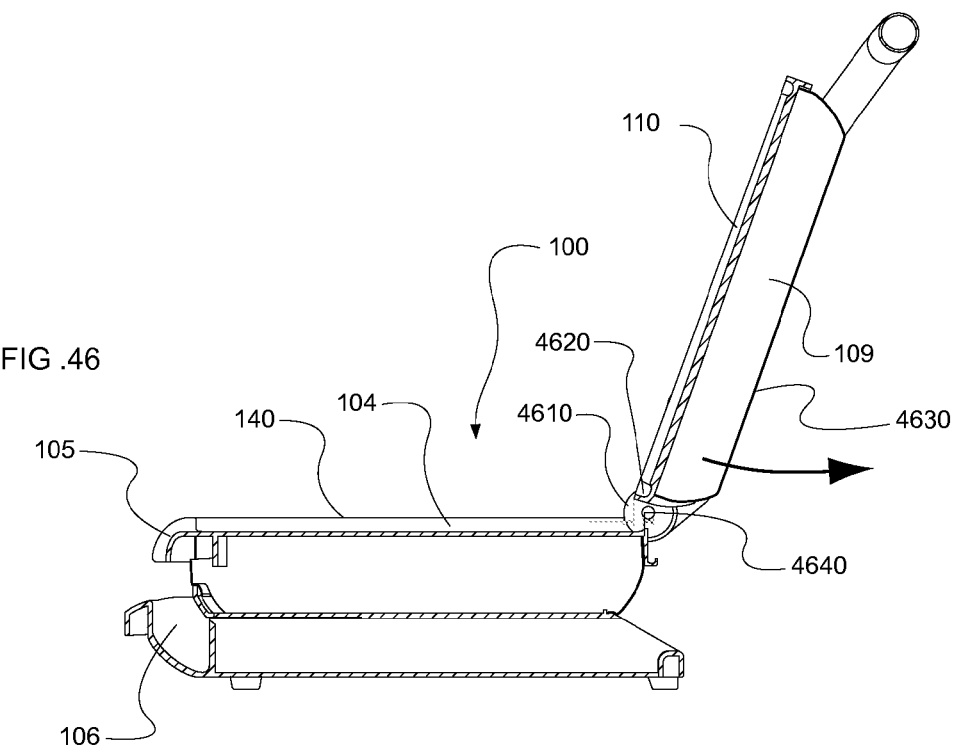
Figure 47:
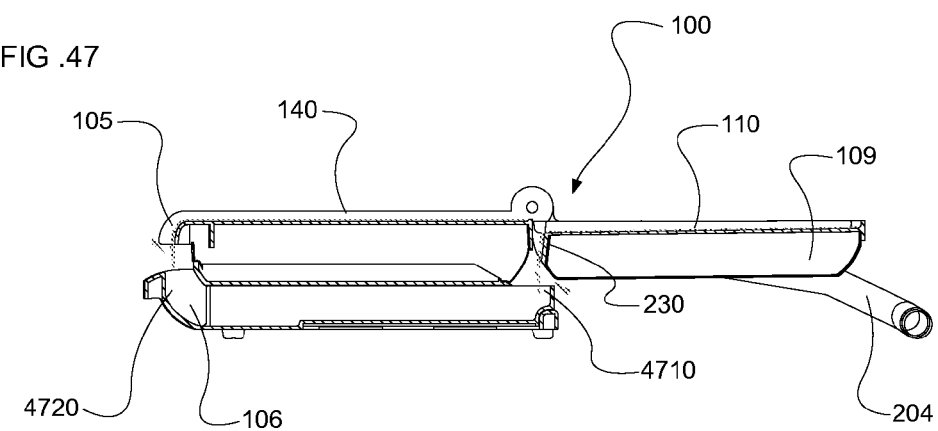
Figure 48:
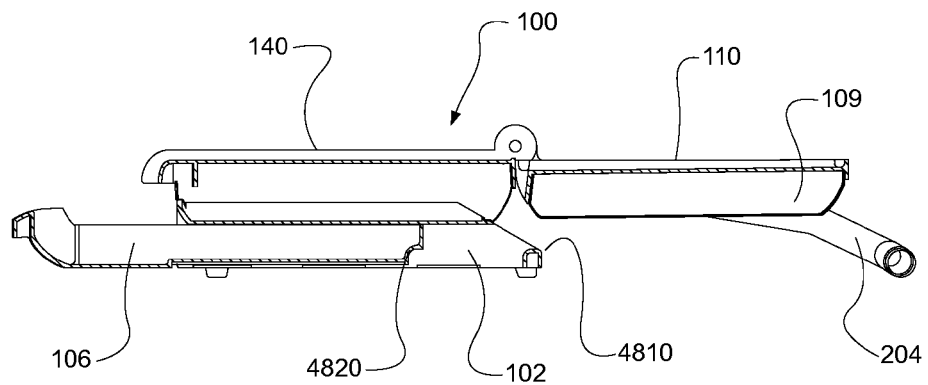
Figure 49:
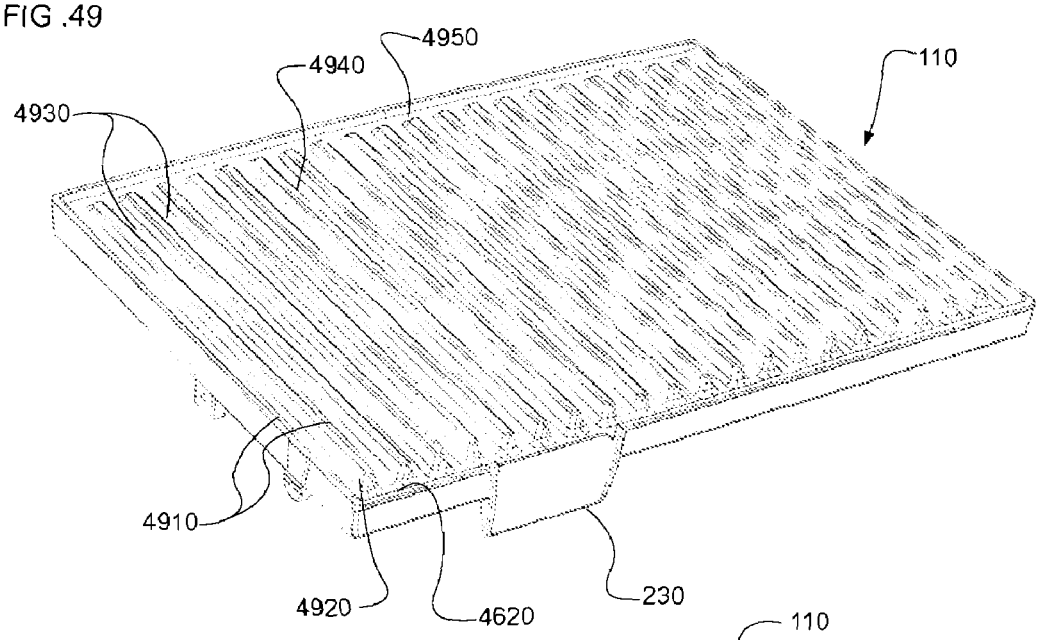
Figure 50:
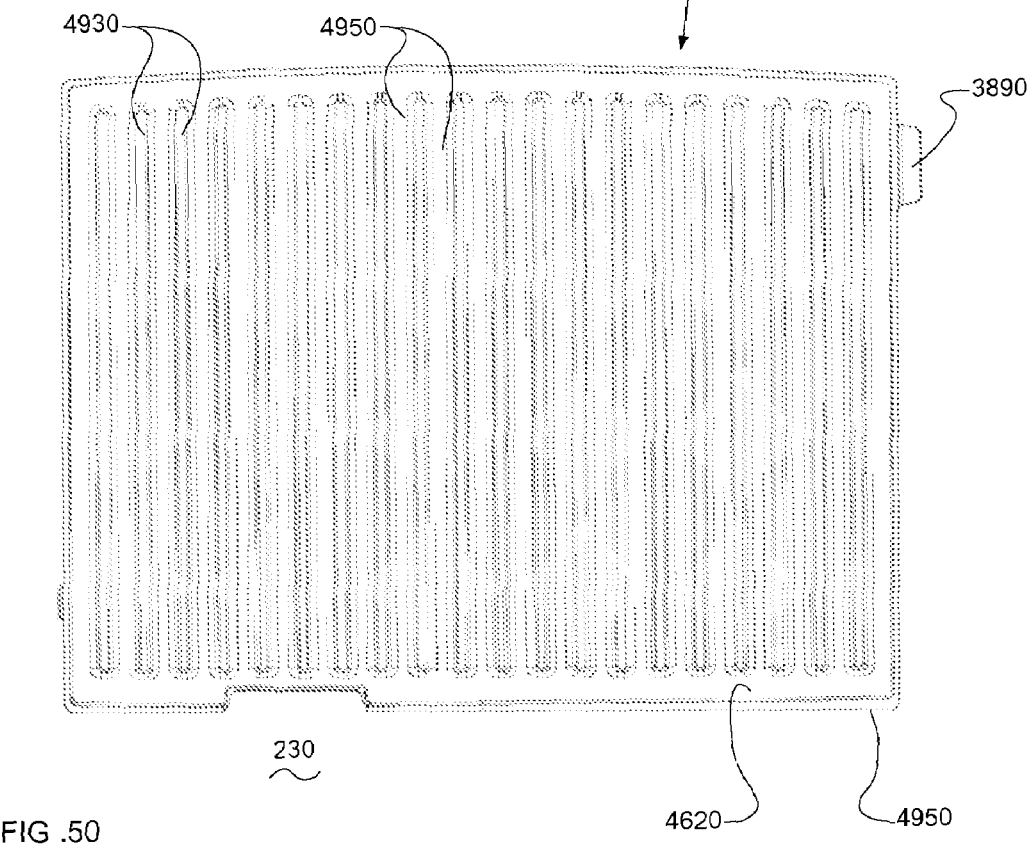
Figure 51:
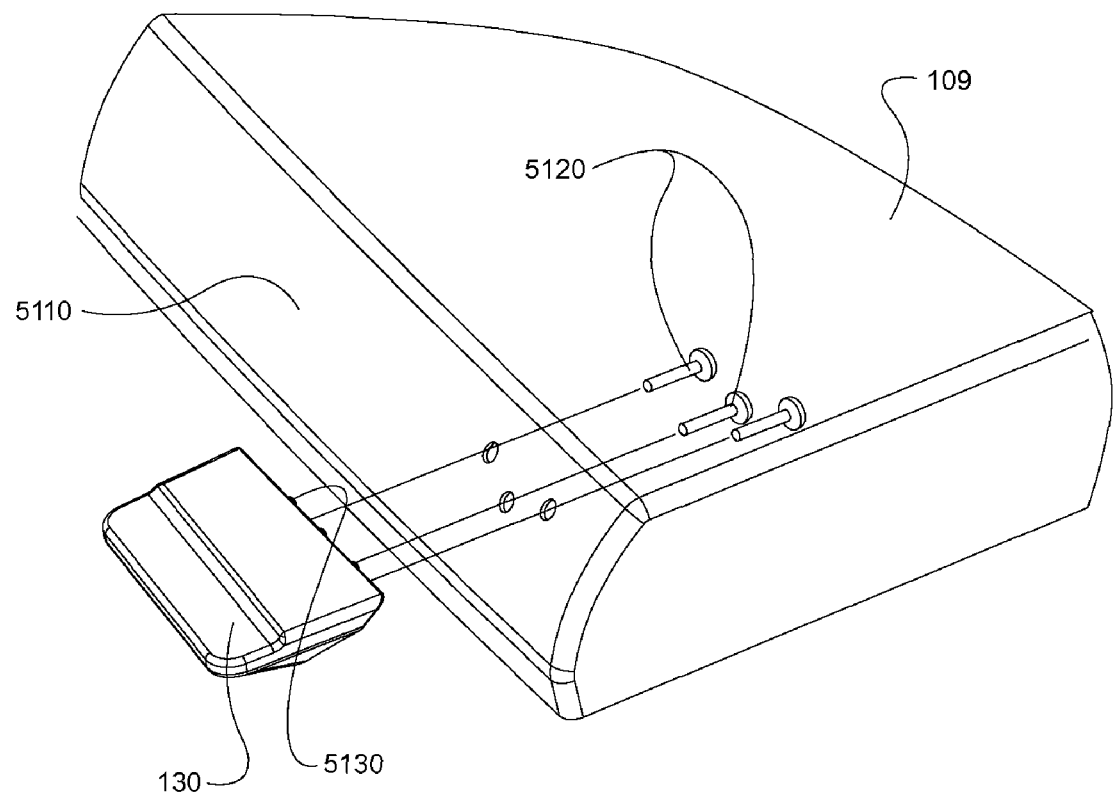

FIGS. 15 (*a*) and (*b*) are isometric views of a toggle;

FIGS. 16 and 17 are isometric views of a track arm;

FIG. 18 is a top plan view of a locking hinge illustrating section lines used in the interpretation of FIGS. 19-37;

FIGS. 19-37 are cross-sectional views of a locking hinge illustrating the selective positioning of the top cooking surface in the fully closed, intermediate, fully open grill and reset positions;

FIGS. 38-40 are side elevations, partially sectioned, illustrating the automatic operation of the actuator arm and support finger;

FIG. 41 is an exploded perspective illustrating the lower cooking plate tilt mechanism;

FIGS. 42 and 43 are cross-sections illustrating the two positions of the tilting lower cooking plate;

FIG. 44 is an exploded perspective of a variable thermostat coupling;

FIG. 45 is a cross-section illustrating the relationship between control knob, coupling and thermostat;

FIGS. 46-48 are cross-section illustrating anti-drip features of the present invention;

FIG. 49 is a perspective view of the upper cooking surface illustrating the spout;

FIG. 50 is a plan view of the upper cooking surface;

FIG. 51 is a perspective of the upper housing and its handle; and

FIGS. 52-56 are circuit diagrams illustrating various components and methods of powering the toaster grill of the present invention.

TOASTER GRILL OVERVIEW

Figure 1:
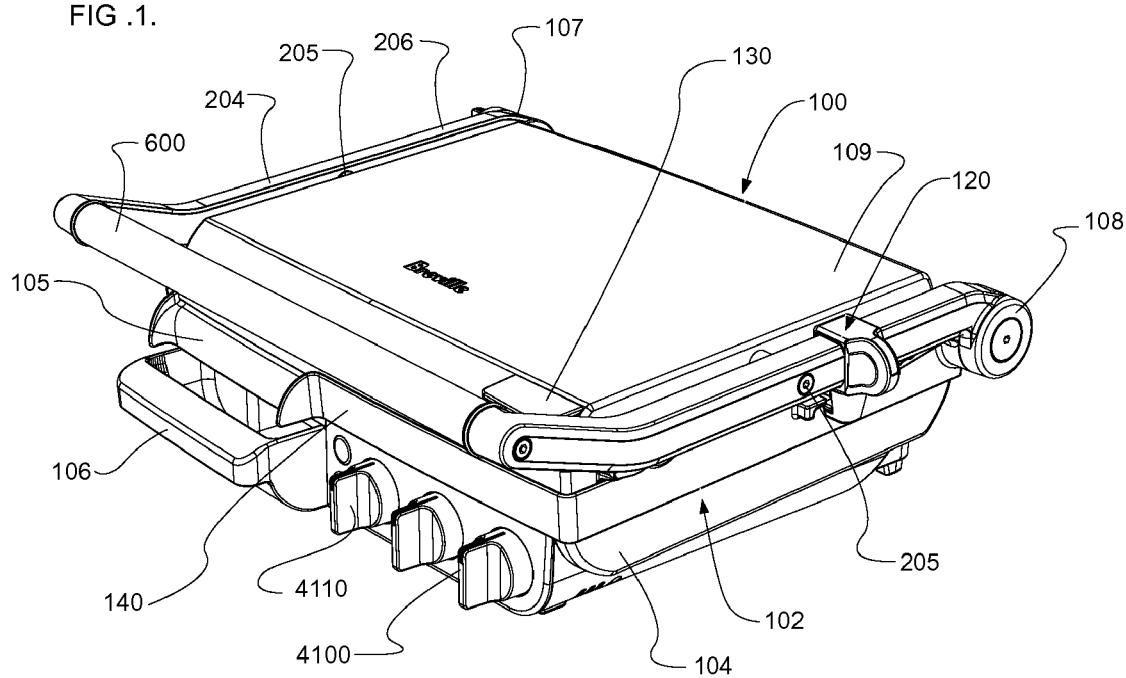
FIG. 1 is a front isometric view of a toaster grill in accordance with the teachings of the present invention.

As shown in FIG. 1, a combination sandwich press and grill 100 has many of the external appearance attributes of a sandwich press. It comprises a lower housing 102 with a lower cooking plate 104. In this embodiment, the cooking plate is shown as being flat although it may also be provided with ribs. To allow for the run-off of cooking liquids, a discharge spout 105 interrupts the elevated rim 140 that serves as a perimeter or barrier to the lower cooking plate 104. The discharge spout 105 leads into a removable, full-length drip tray 106. In preferred embodiments, the rear corners of the lower cooking surface 104 are each formed as functional components of the main hinge mechanism 107 and 108 (see FIG. 9).

Figure 2:
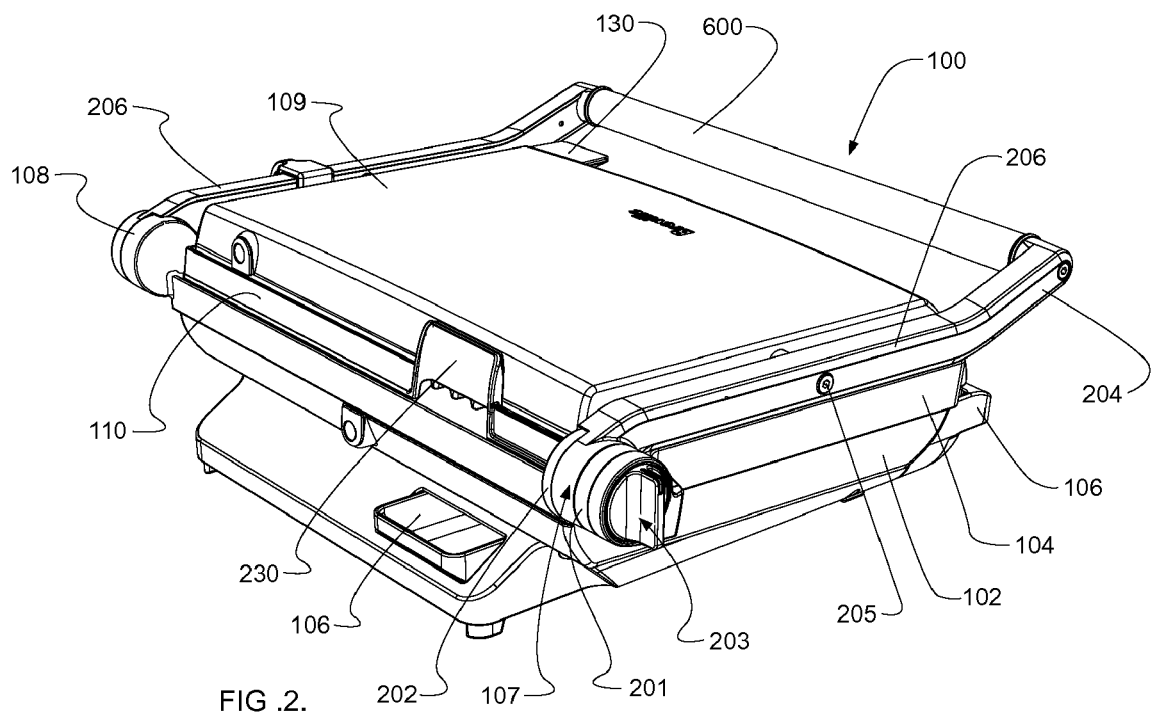
FIG. 2 is a rear isometric view of the device depicted in FIG. 1.
Figure 8:
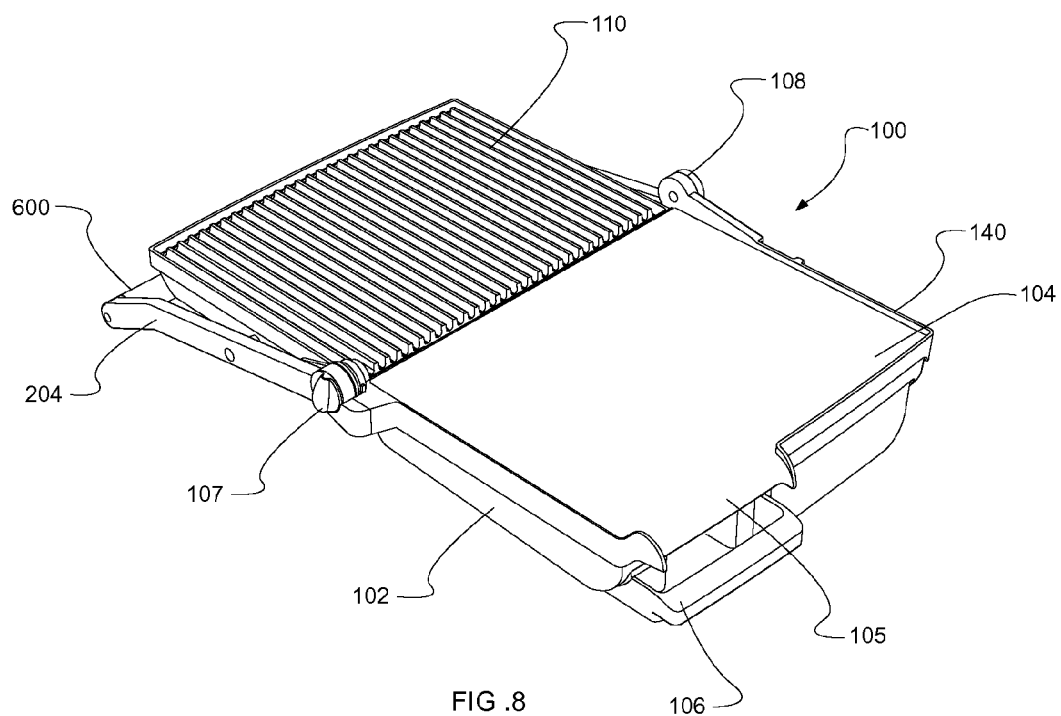
FIG. 8 is a perspective view of the device depicted in FIG. 1 in a fully open grill orientation.
Figure 9:
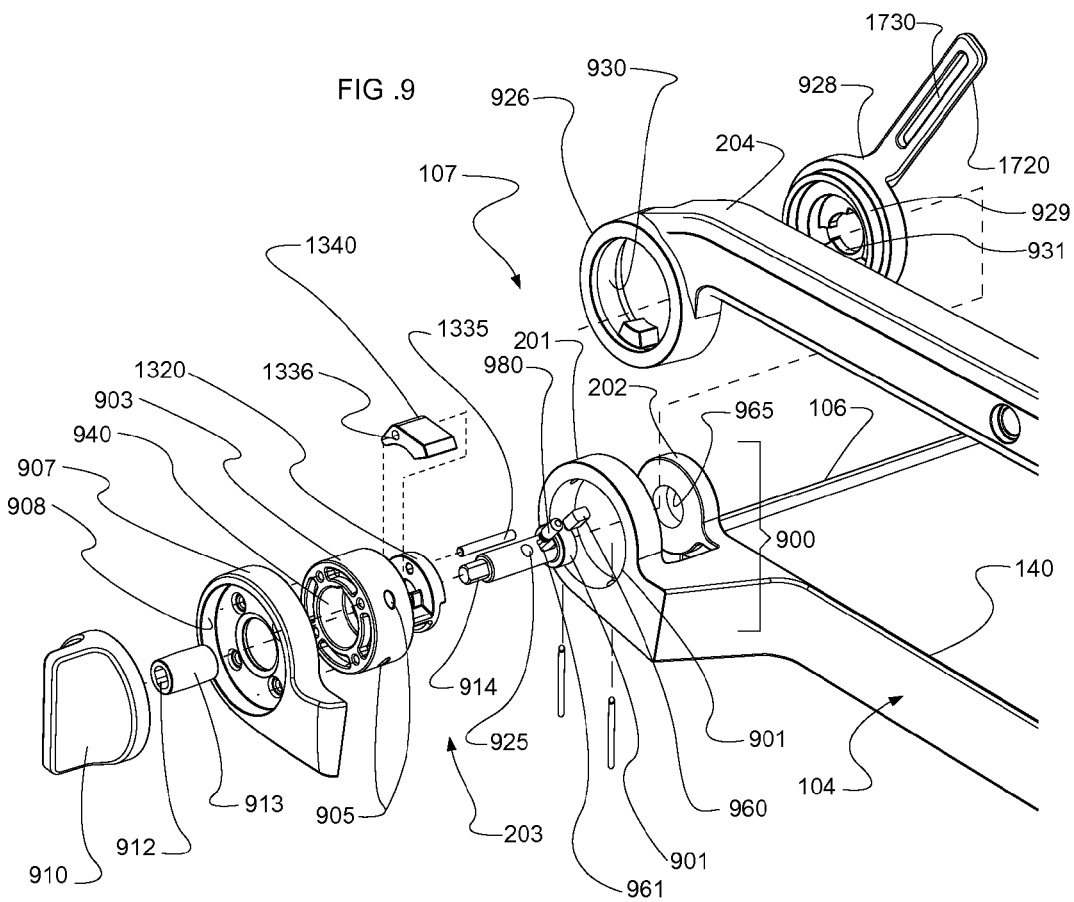
FIG. 9 is an exploded perspective of a locking hinge.
Figure 10:
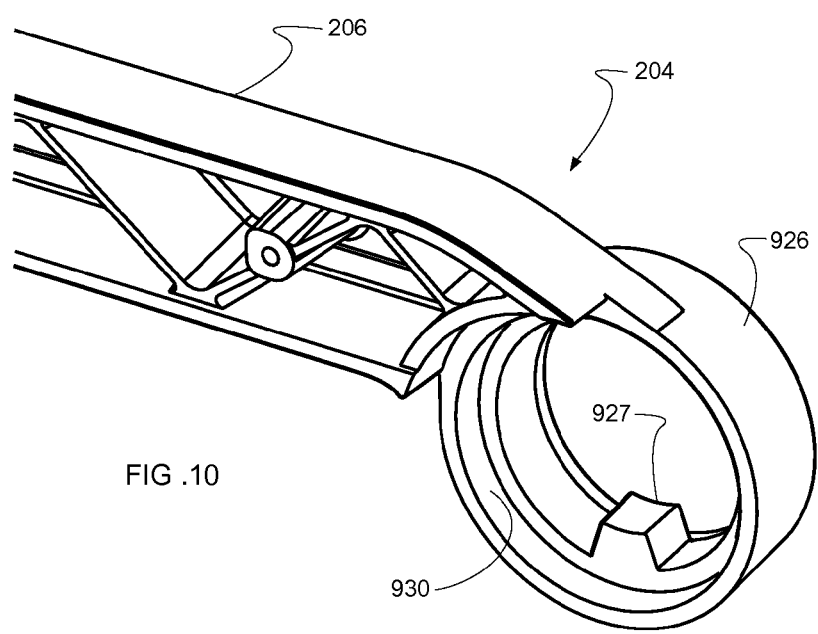
FIG. 10 is an isometric view of a frame arm shroud.

As shown in FIGS. 2 and 9, the hinge components 201, 202 that comprise the rear left corner area of the lower cooking plate 104 are formed as spaced apart flanges with concentric openings. These hinge components support the internal hinge locking mechanism 107, 900 as well as one end of a generally "U" shaped frame 204 that supports the upper housing 109. As shown in FIGS. 1-8, a pivot 205 attaches the upper housing 109 to each side arm of the "U" shaped frame 204 at points approximately mid way along each arm 206.

Figure 7:
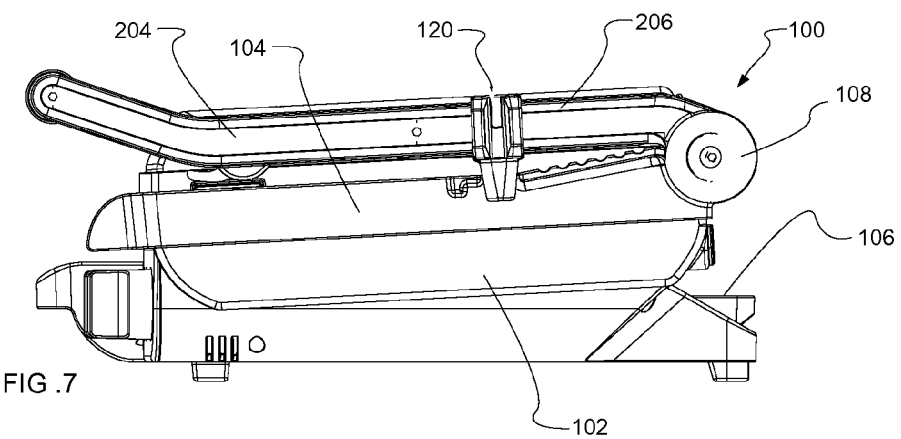
FIG. 7 is a side elevation of the device depicted in FIGS. 1 and 2 illustrating the upper housing spacing mechanism.

As shown in FIGS. 3-8, the upper housing 109 may be positioned into a number of different cooking orientations with respect to the lower cooking plate 104. As will be further explained, the tilt position of the lower cooking plate 104 is also adjustable. As shown in FIGS. 3 and 7, the device 110 has a fully closed orientation. An adjustment mechanism 120 (well known in sandwich presses) allows the upper and lower housings to be locked together for storage purposes. This same mechanism 120 allows the upper housing 109 and the upper cooking plate 110 to be spaced apart from and above the lower cooking plate 14 in a number of discreet steps. In these cooking and toasting configurations, the upper cooking surface 110 will tend to remain generally parallel with a lower cooking surface 104. However, the pivot 205 allows it to accommodate irregularly shaped foods. The upper housing 109 is provided with an adjustment handle 130 (see FIG. 51) that can be used to manipulate or position the tilt angle of the upper housing 109 and its cooking plate 110.

As shown in FIG. 5, the upper housing 109 can be opened to an intermediate point where it rests against stops located within the hinge mechanism 107. In this orientation, it is opened to about 110° from horizontal and gravity tends to urge the upper housing 109 against the internal stops to keep the device in this intermediate orientation. As shown in FIG. 46 and as will be further explained, in this intermediate orientation, the lowest edge of the upper cooking surface 110 is automatically positioned over the lower cooking surface 104 so that it drips only onto the lower surface 104. This positioning of the lower edge of the upper cooking surface is achieved by means of a track arm 928 as will be detailed in latter parts of this description.

As shown in FIGS. 6 and 8, the device 100 is also capable of assuming a fully open grill orientation primarily for higher temperature cooking. In this orientation, higher temperatures can be used to cook meats, eggs and other foods that would normally be fried or grilled. As will be further explained, this orientation is achieved by manually deactivating the locking mechanism 107. In this open grill orientation, the handle of the "U" shaped arm 204 serves as a foot. As depicted in FIGS. 6 and 40, the cross-piece or handle 600 makes contact with the bench or counter top so as to better support the upper housing 109. In preferred embodiments, the handle 600 may be slightly bowed or curved so that it makes contact in its centre. It should be noted that in the open grill orientation, the upper housing 109 and its upper cooking surface 110 are effectively immobilised. Any tendency for the cooking surface 110 to tilt is eliminated by mechanical features as will be further explained. FIGS. 2 and 47 also illustrate that the liquid run-off of the upper plate 110 is collected by a discharge spout 230 located at the front of the upper cooking surface 110 (when fully opened). The spout 230 discharges into a rear portion of the drip tray 106 that protrudes through the back surface of the lower housing 102.

Hinge Locking Assembly Overview

An overview of the locking mechanism 107, 900 is presented here. The locking mechanism is built into one side of the hinge that interconnects the upper and lower housings. The locking mechanism comprises a single rotating knob with two user selectable positions that permit the upper housing to pass through the intermediate orientation into fully open position in which the upper cooking surface is supported in a horizontal grilling position. A more detailed discussion follows in the explanation of the operation sequence.

Figure 11:
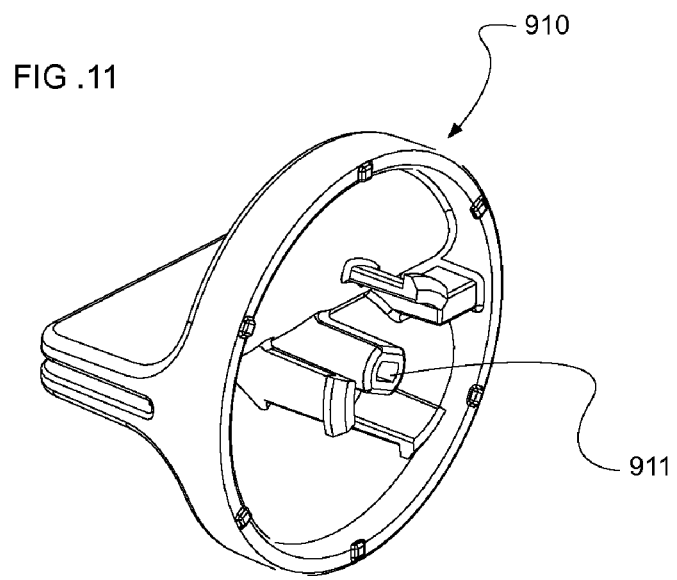
FIG. 11 is a rear isometric view of a control knob.
Figure 12:
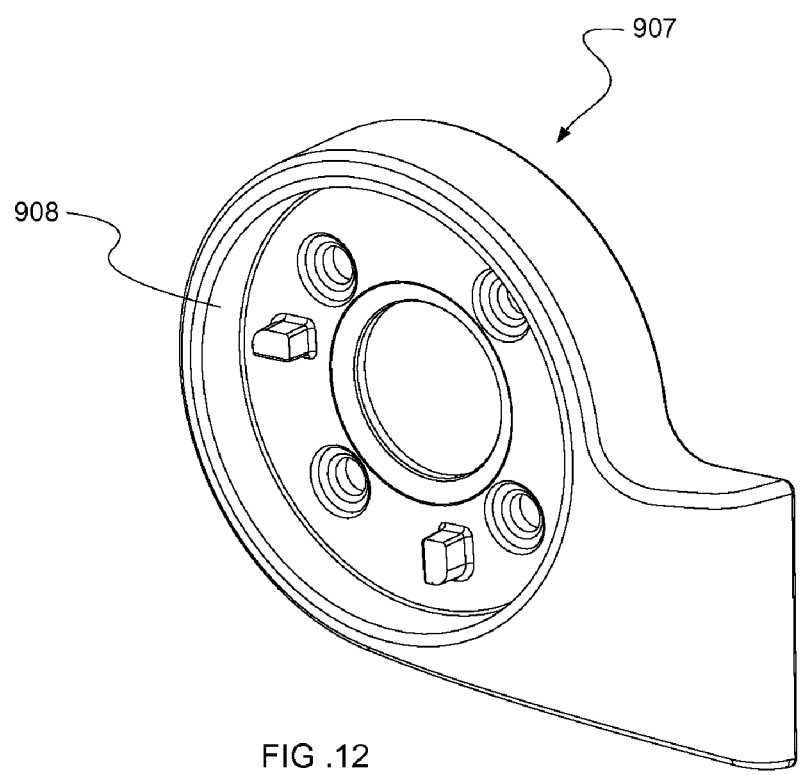
FIG. 12 is an isometric view of a hinge facia.

As shown in FIG. 9 an appliance such as a toaster grill 100 has a lower cooking plate 104 that includes integral hinge components 201, 202 formed as a backing plate 202 and a lock barrel retainer 201. The backing plate has a journal opening 965 for receiving an enlarged distal head 970 of a lock shaft 925. The lock barrel retainer 201 has openings 901 for admitting one or more set screws or roll pins 902 that are used to hold the lock barrel 903 in place and keep it from rotating. The barrel 903 has cooperating pin retaining openings 905, 906 (see FIGS. 13 and 14). The lock barrel 903 is covered by an ornamental lock facia 907 (see FIG. 12). The facia 907 includes a recess 908 for receiving an operating knob 910 (see FIG. 11). The knob 910 includes a stub shaft 911 that passes through an opening in the facia 907 and is received by a first opening 912 in a lock coupling 913. The coupling 913 extends to connect with a stub shaft 914 formed on the proximal end of the lock shaft 925. The lock shaft 925 extends into or through the central axial opening 940 of the lock barrel 903.

The lock shaft carries two spring loaded pins. The first is the cam pin 980. It operates on the underside of the toggle 1340 and controls the toggle in response to the user defined position of the control knob 910. The reset pin 960 is engaged by cooperating cam surfaces formed into the lock barrel and the track arm so as to reset the lock shaft, control knob etc., when the user closes the device after using it in the fully open grilling orientation.

The left arm 204 of the "U" shaped frame terminates in a cylindrical shroud 926. The shroud 926 has an internal bore in which is formed a tooth 927 that is used in limiting the range of motion of the "U" shaped frame. The shroud conceals the internal components of the locking assembly. In this example the shroud 926 is part of the rotating frame 204, but it may be formed as a portion of any rotating component over which manual rotational control, by a user, is sought.

As shown in FIGS. 9, 16 and 17, a track arm 928 is located between the base plate 202 and the shroud 926. The track arm includes a pilot rim 929 that pilots into an expanded bore 930 of the shroud 926. The track arm also includes a central opening 931 that acts as a cam surface for the spring loaded reset pin 960 and a step 950 that acts against the reset pin 960 during the reset phase of motion. In the example of FIG. 9, the reset pin 960 is rectangular and resides in a radial opening 961 in the lock shaft 925. Offset from the rear face 1710 of the track arm is a retaining arm 1720 in which is formed an elongated slot 1730. As shown for example in FIG. 19-29, a pin 2100 formed, for example, on the upper housing or upper cooking plate and the pin rides in the slot 1730. Thus, the position of the track arm determines aspects of the motion of the upper housing as will be explained.

As shown in FIG. 16, the track arm 929 has a pilot rim 929 within which is formed a first bore 1610 and a smaller, deeper second bore 1620. The first track arm bore 1610 has formed in it a first limit member 1615 and the second track arm bore has a second limit member 1630. The limit members may be integral or inserted separately into the track arm body so that harder materials may be used as depicted in FIG. 17.

Figure 13:
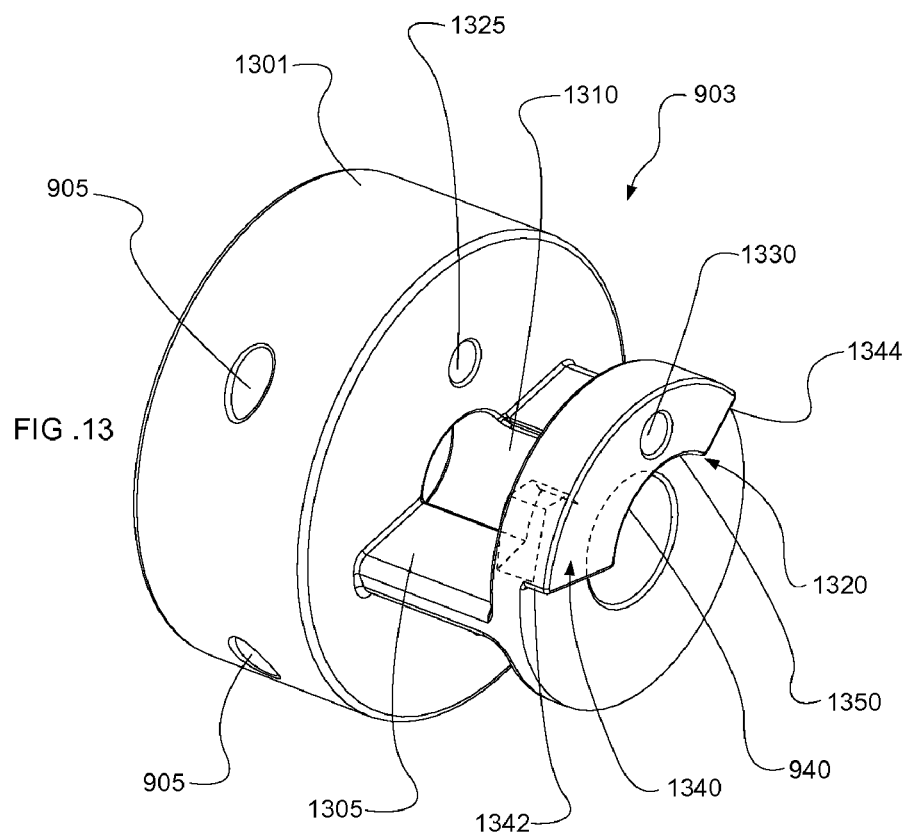
FIGS. 13 and 14 are isometric views of a lock barrel.
Figure 14:
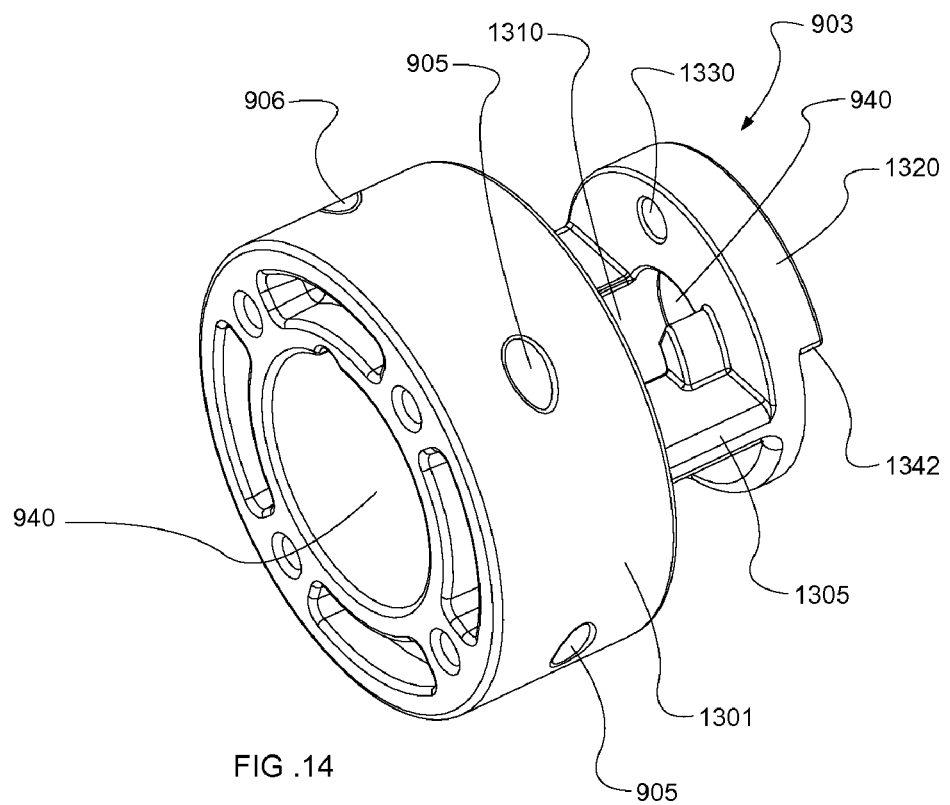

As shown in FIGS. 9 and 13-14, the lock barrel 903 comprises a main body section 1301 in which are formed the pin retaining openings 905, 906. A mid-body 1305 with a half bore 1310 leads to an end plate 1320. A pair of cooperating openings, one in the end of the main body 1325, and one in the end plate 1330 support a toggle shaft 1335 that passes through an opening 1336 in the toggle 1340 (see FIG. 15). As will be explained the toggle 1340 selectively limits the motion of the "U" shaped frame and upper housing in response to the position of the control knob 910. As shown in FIG. 13, the inner face of the end plate 1320 includes an arcuate bumper 1340 having first 1342 and second 1344 rotational end stops. The second limit member 1630 within the track arm acts against the end stops 1342, 1344 of the bumper 1340 to limit the absolute range of motion of the track arm 928. The bumper also has an underside or cam surface 1350 that has the same profile as the cam surface 931 of the track arm 928. When the track arm is carried into the fully closed position, the cam surfaces 931 and 1350 align as do the step 950 and the first rotational stop 1342 of the bumper 1340.

Operational Sequence of the Locking Mechanism

The operational sequence of the locking hinge assembly 107, 900 will now be explained with reference to drawing FIGS. 18-37. These drawing figures represent cross-sections taken through four distinct vertical planes. FIG. 18 illustrates the four planes that will be referred to. With reference to the axis of the locking mechanism 900, the drawing figures the term "inward" describes a direction from the knob 910 toward the backing plate 202 and the term "outward" describes the reverse direction.

With reference to FIG. 18, the section A-A is a section through the toggle 1340 but outward of the cam pin 980. Section B-B passes through the cam pin 980. Section C-C passes through the reset pin 960 and the lock barrel bumper 1340. Section D-D passes through the reset pin and track arm 928.

A. Fully Closed

Figure 19:
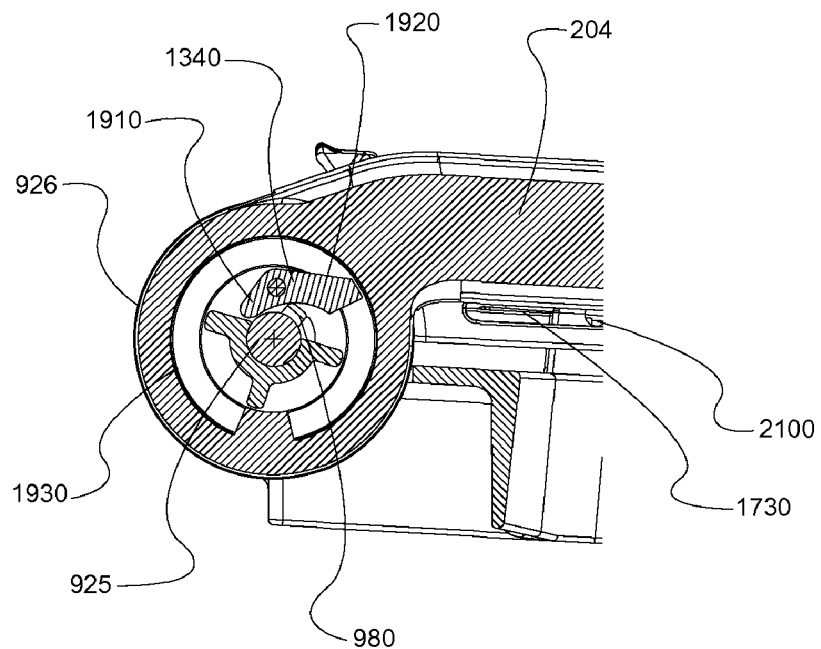
Figure 20:
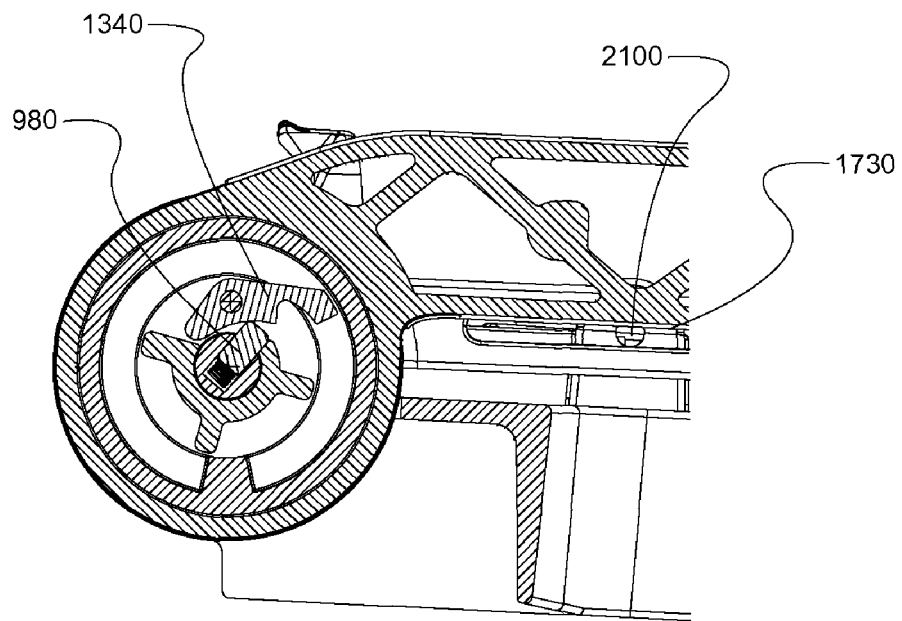
Figure 21:
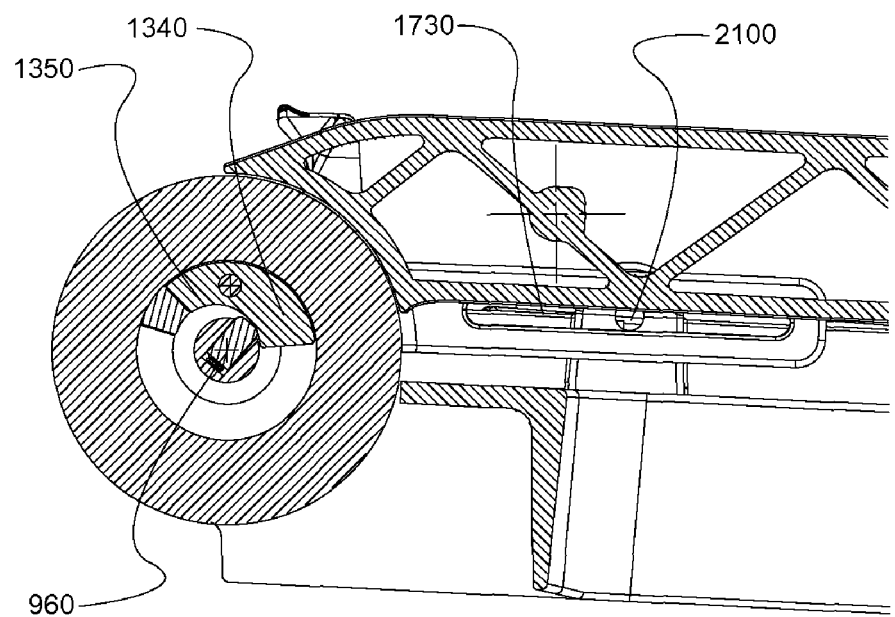

FIG. 19 is a cross-section through the A-A plane of the hinge locking mechanism illustrating the arm 204 and therefore the upper housing in the fully closed orientation. As shown in this figure, the toggle 1340 is urged by the cam pin 980 into an extended position. In this position, the tail end 1910 of the toggle 1340 contacts the locking shaft 925 and the tip or head end 1920 of the toggle does not interfere with the inside diameter 1930 of the shroud 926. FIG. 20 is taken through plane B-B and shows the cam pin 980 impinging on the curved underside of the toggle 1340. In this view it can be seen that the cam pin 980 is in a fully extended position. As shown in FIG. 21, the reset pin is depressed by the underside 1350 or cam surface of the bumper 1340. The reset pin is also depressed by the cam surface 931 of the track arm 928.

B. Intermediate and Locked

Figure 22:
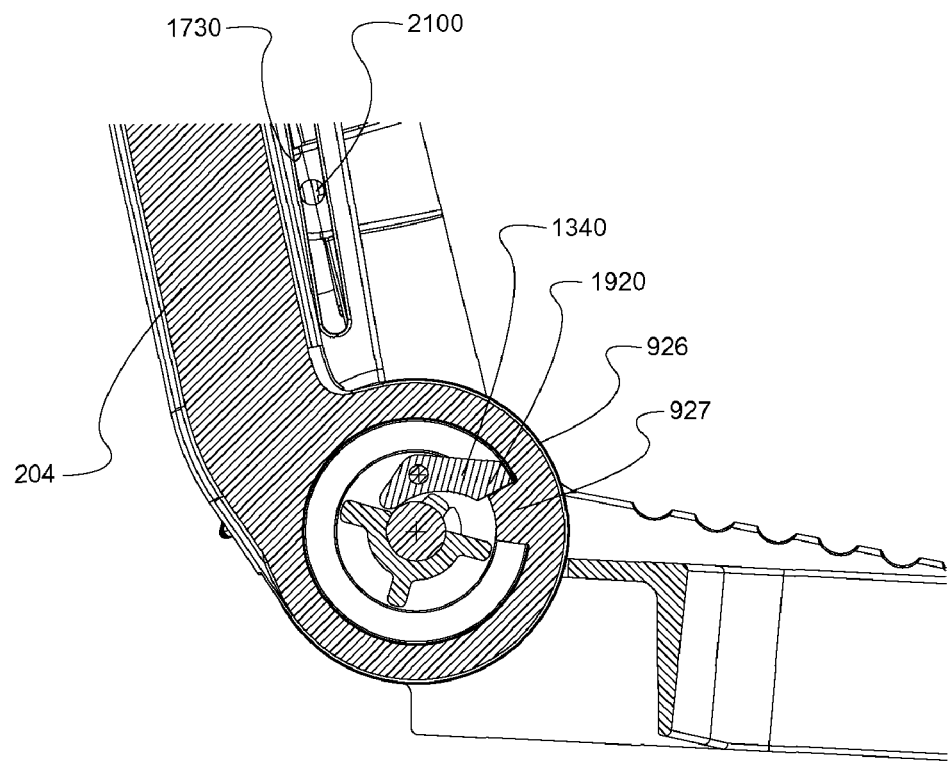
Figure 23:
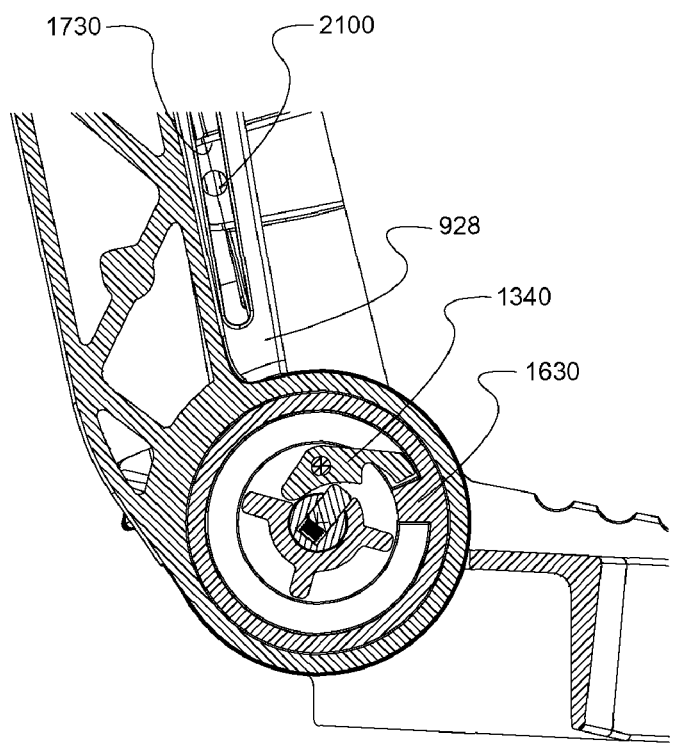

FIG. 22 is a cross-section through the hinge locking mechanism 107 through plane A-A. As shown here, the parallel arms 204 of the "U" shaped frame and therefore the upper housing are in an intermediate orientation. The upper cooking surface 110 can not rotate away from the lower cooking surface 104 because the tooth 927 in the shroud 926 is interfered with or prevented from further rotation by the head 1920 of the toggle 1340. A user can bring the upper and lower cooking surface closer together but not further apart. When the upper housing is inclined by more than 90° gravity tends to keep the upper housing in this intermediate "upright" and intermediate orientation leaning against the stop provided by the toggle 1340. In the upright and locked orientation the upper cooking surface is inclined from the horizontal by about 110°. In the upright and locked orientation the upper cooking surface is inclined from the horizontal by about 110°. FIG. 23, taken through plane B-B shows that the second limit member 1630 of the track arm 1928 also impinges against the inner portion of the head of the toggle 1340 when the upper housing is in the intermediate orientation. FIGS. 24 and 25 (taken through planes C-C and D-D respectively) show that the lock shaft 925 is still in the "locked" position and that the step 950 of the track arm is rotated away from its closed position.

C. Closed and Unlocked

Figure 26:
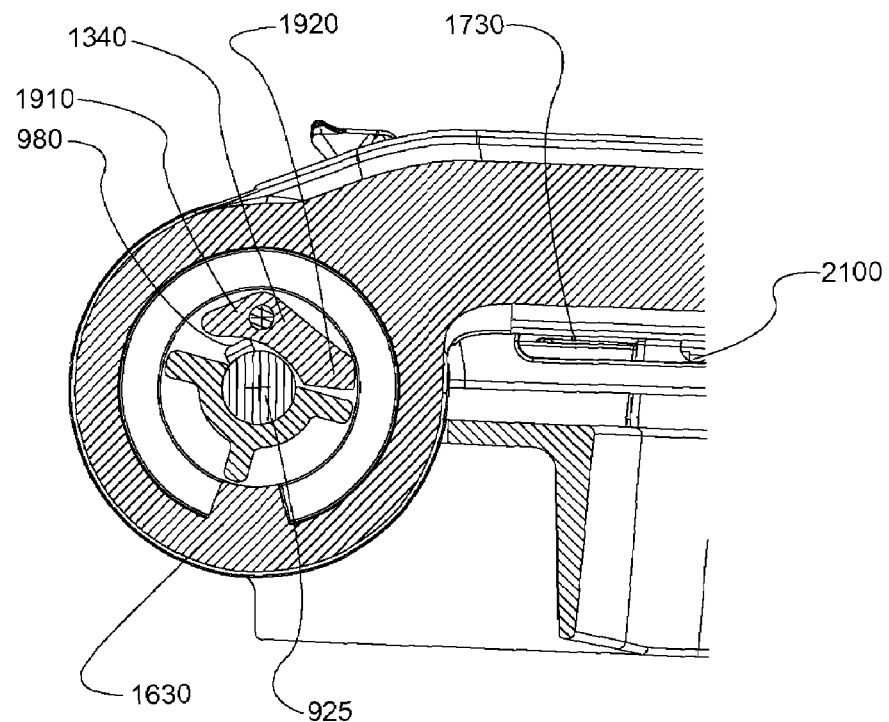
Figure 27:
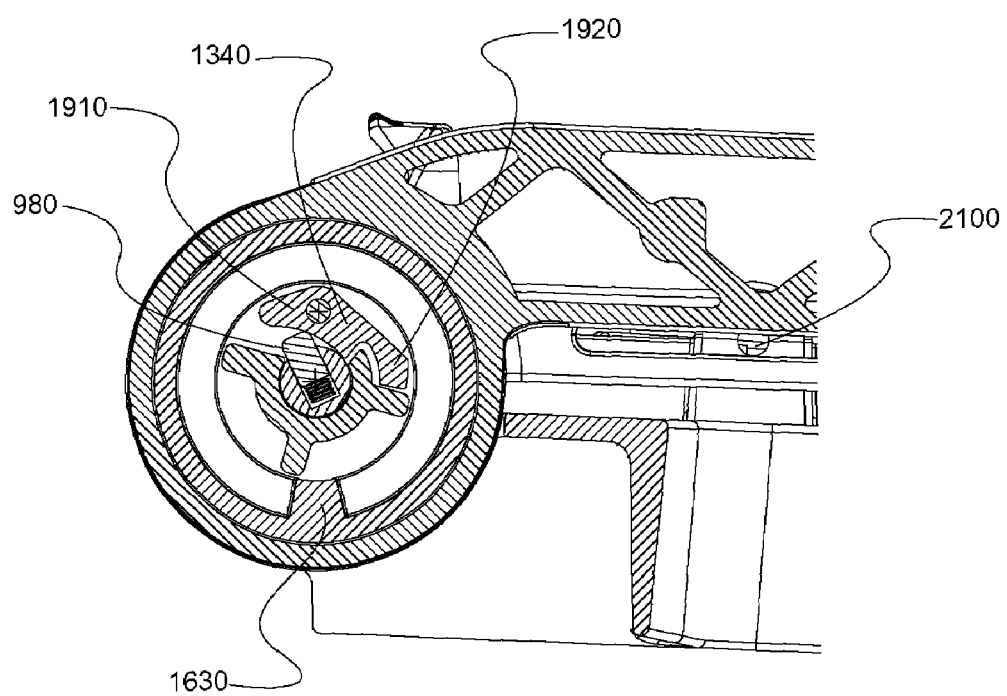
Figure 28:
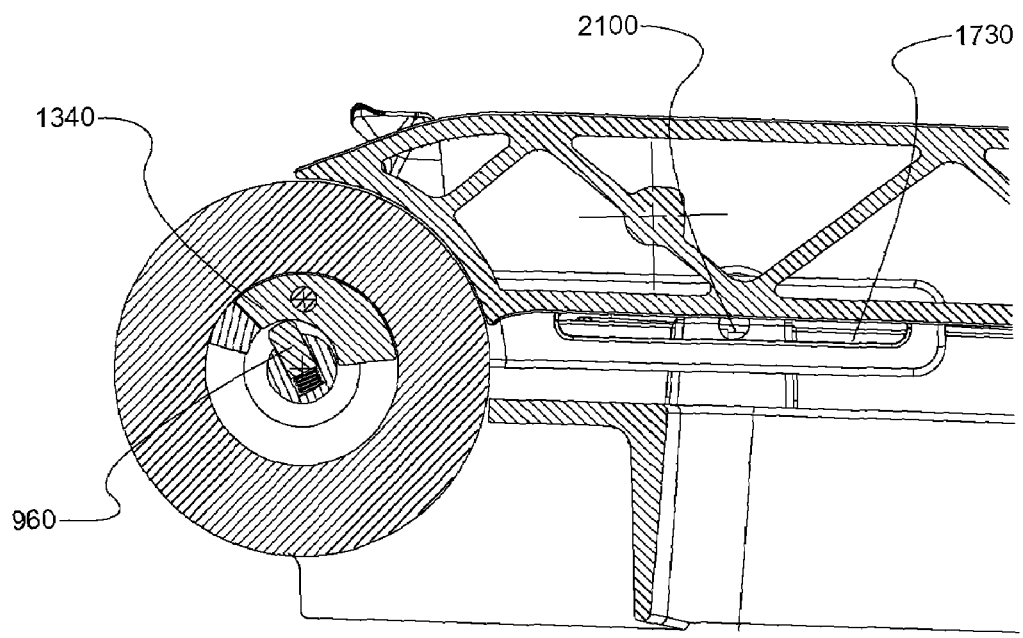
Figure 29:
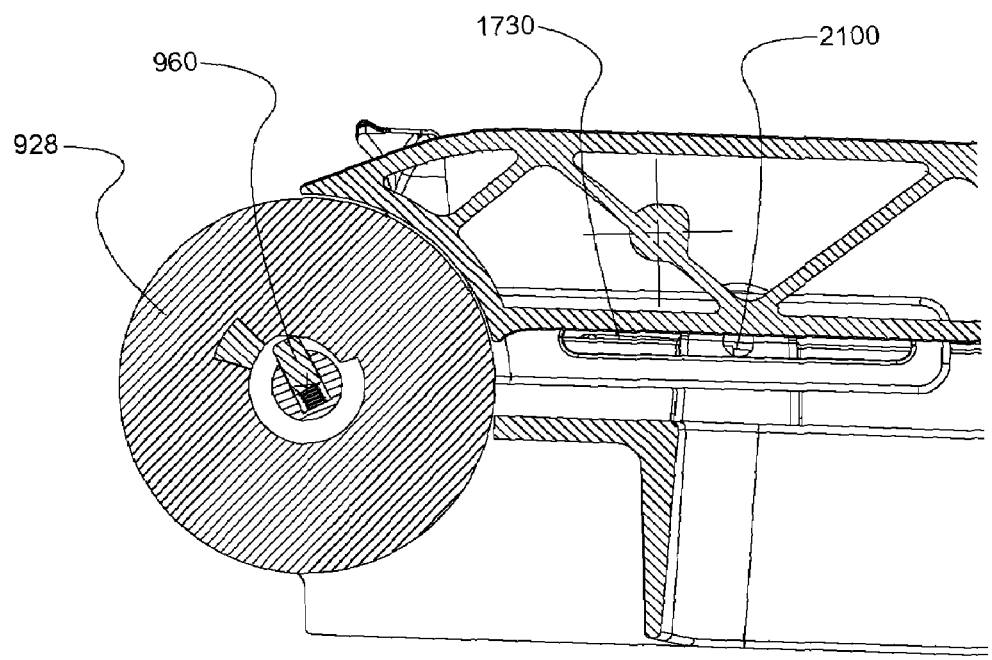

In order to position the upper housing and upper cooking plate 110 into a fully opened or grilling orientation it is necessary to first close the device by using the handle 600 to bring the "U" shaped frame and the upper housing into a fully closed orientation. When fully closed, the control knob 910 is rotated counter clockwise (for example with reference to FIGS. 2 and 9). This has the effect of rotating the lock shaft 925 and the cam pin, thus urging the toggle into an "unlocked" position as shown in FIGS. 26-29. FIGS. 26-29 are taken respectively through planes A-A, B-B, C-C and D-D. As shown in FIG. 26, the locking shaft 925 has been rotated into the retracted or "unlocked" position. As shown in FIGS. 26 and 27, the cam pin 980 now impinges on the tail 910 of the toggle 1340. This has the effect of rotating the head 1920 about the shaft 1335 into a position where it is clear of the rotational movement of the tooth 1630. As shown in FIGS. 28 and 29, the reset pin 960 is now extending as the underside 1350 of the bumper 1340 nor the cam surface 931 of the track arm 928 release it. From this orientation, the "U" shaped frame and upper housing are free to be rotated, by the user, past the intermediate or upright orientation into a fully open or grill orientation.

D. Grill Orientation

Figure 30:
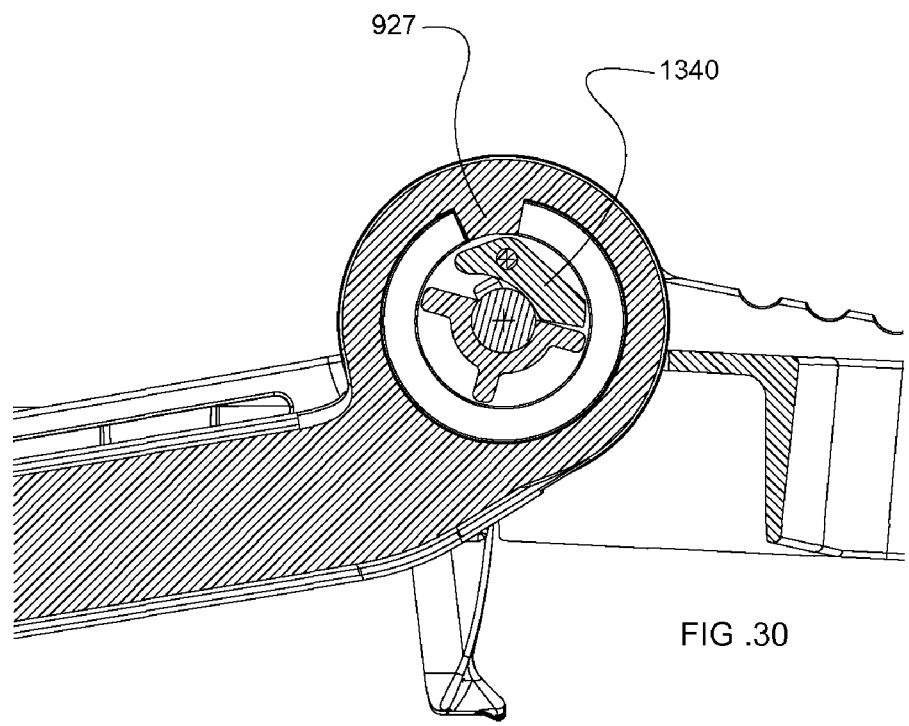
Figure 31:
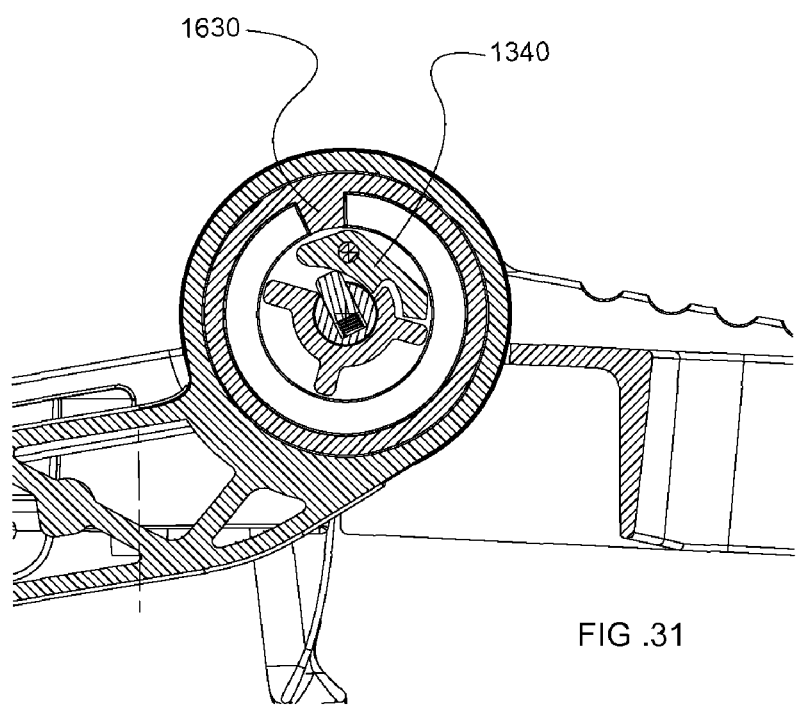
Figure 32:
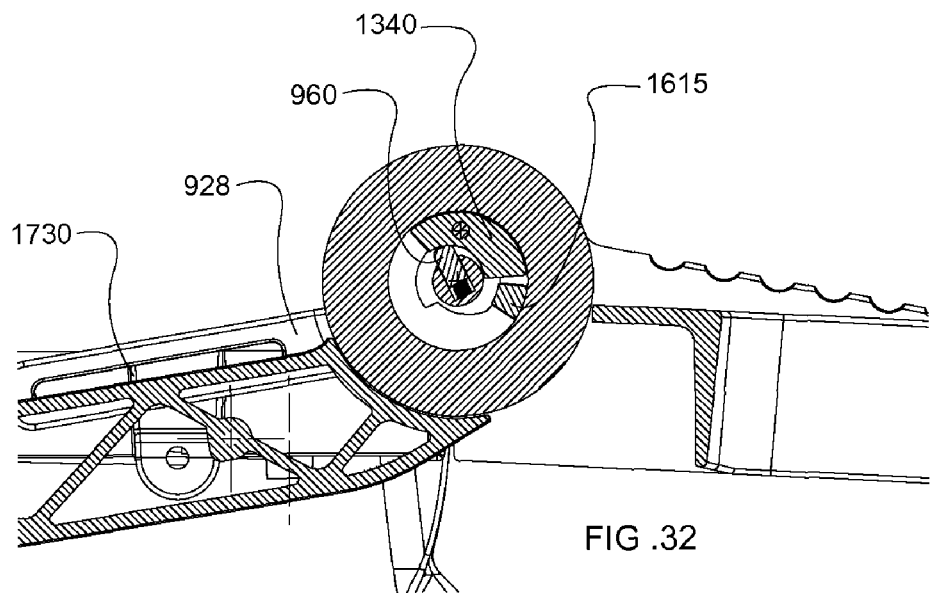
Figure 33:
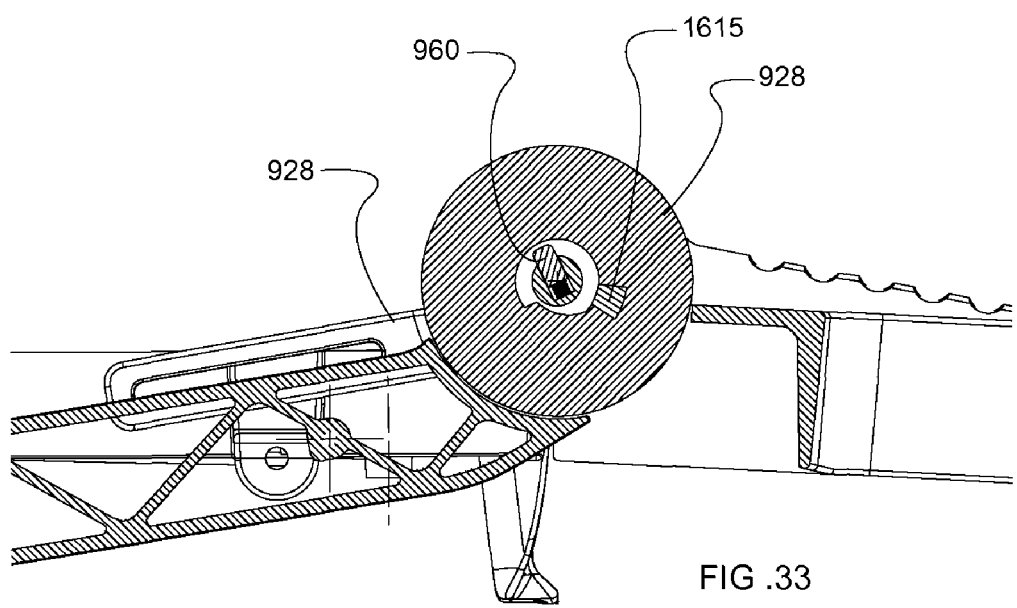
Figure 34:
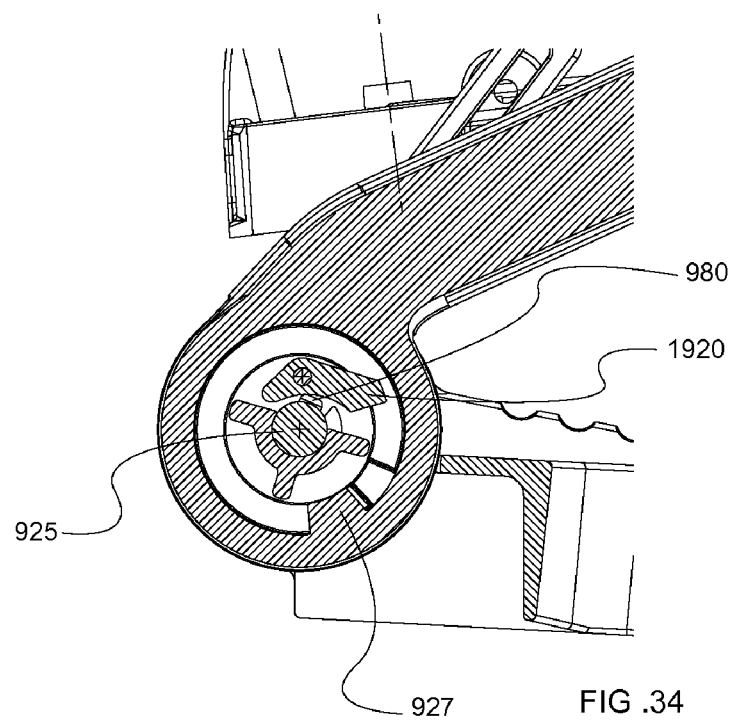
Figure 35:
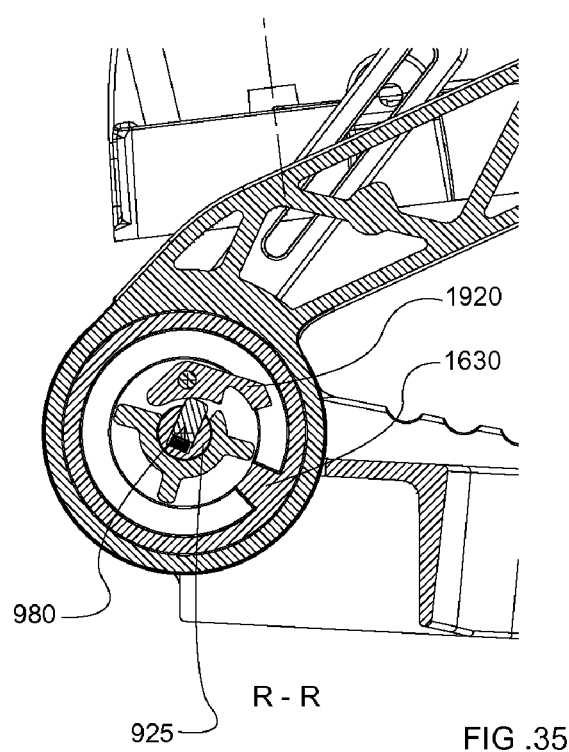

Cross-sections of the lock mechanism 107 in the grill orientation are depicted in FIGS. 30-33. FIGS. 30-33 are taken through planes A-A, B-B, C-C and D-D respectively. As shown in FIGS. 30 and 31, the tooth 927 and second limit member 1630 of the track arm 928 have rotated past the toggle 1340 without interference. In this orientation, the upper cooking surface 110 is in a horizontal orientation and the handle 600 of the "U" shaped frame is resting on the same surface that supports the lower housing. As seen in FIGS. 32 and 33, the reset pin 960 is fully extended. With reference to FIG. 32, the track arm 928 is fully extended and prevented from further rotation away from the lower cooking surface because the first limit stop 1615 of the track arm 928 is up against the first rotational stop 1342 of the bumper 1340.

Because the upper housing's pin 2100 is located within the slot 1730, the upper cooking surface 110 is prevented from further clockwise rotation about its pivot (clockwise being relative to the depiction in FIG. 32). Counter clockwise restraint of the upper cooking surface will be dealt with below.

E. Reset

From the grill orientation depicted in FIGS. 30-33, the user can close and reset the hinge locking mechanism 107 simply by grasping the handle 600 and fully closing the unit. This motion of the upper housing, "U" shaped frame and track arm 928 have the effect of resetting the locking mechanism so that subsequent attempts to open the unit encounter the mid point locking orientation depicted in FIGS. 22-25. This re-setting action is depicted in FIGS. 34-37.

Figure 36:
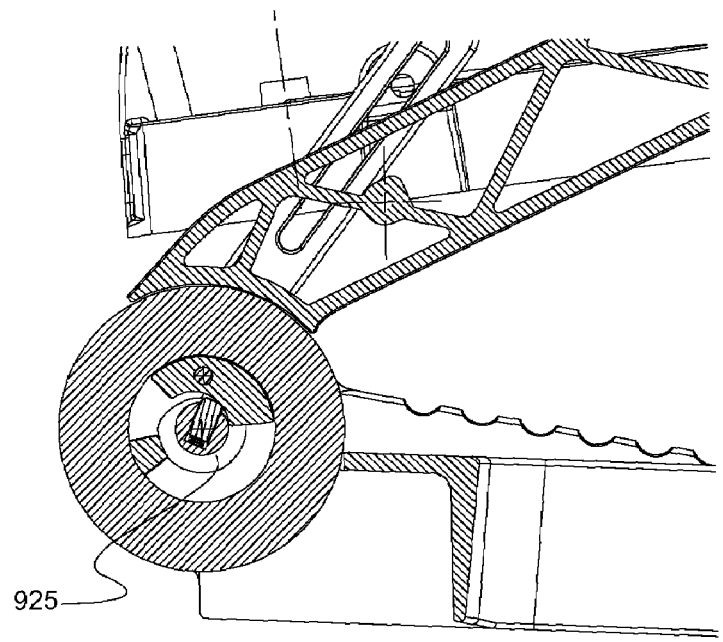
Figure 37:
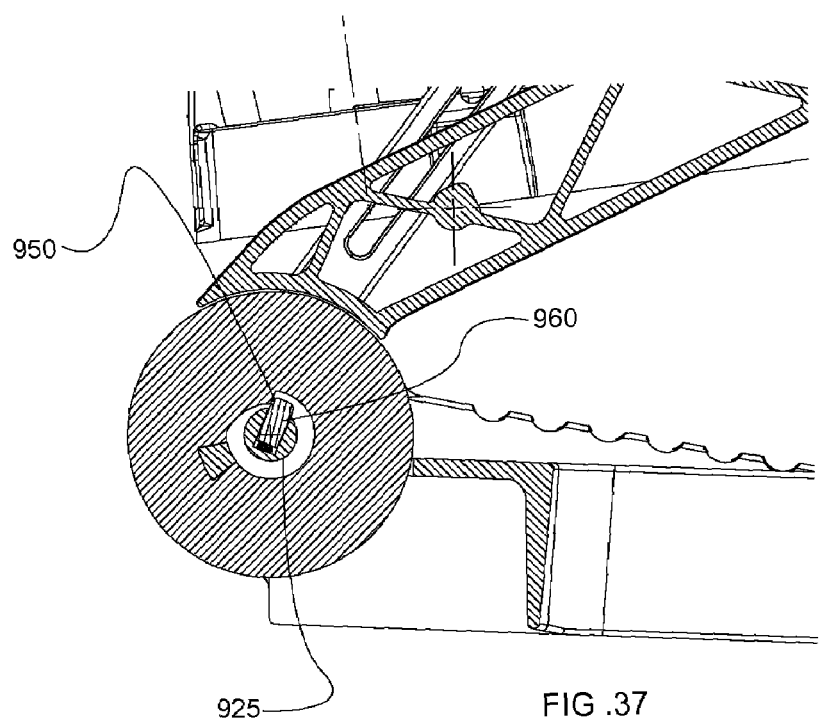

FIGS. 34-37 are taken through planes A-A, B-B, C-C and D-D respectively. FIGS. 36 and 37 illustrate that the step 950 in the central bore of the track arm has caught the extended reset pin 960 and is thus rotating the reset pin 960 and the lock shaft 925 back toward its original position. As this is occurring the cam surface 1350 of the lock barrel guides the reset pin back into its bore, retracting it, as the rotation of the lock shaft continues under influence of the track arm.

When fully reset the reset pin is retracted and clear of the track arm. As the lock shaft 925 and the cam pin 980 rotate cock wise in these views, it can be seen in FIGS. 34 and 35 that the cam pin 980 is now allowed to extend and lift the toggle's head 1920 radially outward into a position where it will interfere with the tooth 927 and first limit 1615. When the unit is reopened, the "U" shaped frame and upper housing will stop in the intermediate or upright orientation.

Restrain of Upper Housing

In cooking orientations between the fully closed orientation and the upright orientation depicted in FIGS. 22-25 and FIG. 5 it is important that the upper housing is free to pivot within a limited range about the horizontal pivots 205. This allows irregular objects to be contacted evenly by both the upper and lower cooking plates even if the object being cooked does not have a parallel top and bottom.

One limitation in this range of pivoting motion is the requirement that the upper cooking surface 110 be rigidised or restrained from pivoting when it is in the fully opened or grill orientation. As previously mentioned, a portion of the limitation of motion is accomplished by the interaction between the upper housing's pin and the track arm as explained with reference to FIGS. 30-33. In these figures, the immobilisation of the track arm prevents the lower edge of the upper cooking surface to fall away from the lower cooking surface.

Limitations in the other direction of pivoting rotation in the grill orientation, are explained with reference to FIGS. 38-40. These figures illustrate the operation of a supporting finger that has no influence on the upper cooking surface 110 until the upper cooking surface is in, or nearly in, a fully extended or grilling orientation. As shown in FIG. 38, a curved supporting finger 3800 is retained by a rotating hub 3810 that is built into the right side arm 3820 of the "U" shaped frame. An actuating rod 3830 is linked at one end 3840 to a point or pin on the pivoting hub 3810. The other end or tracking end 3850 of the actuating arm 3830 extends into a cavity 3860 located within the rear shroud 3870 of the right side arm 3820. Also located within the shroud 3870 is a cam surface 3880 that is integral with either the lower cooking plate 104 or the lower housing 102. When the "U" shaped frame is partially opened and as shown in FIG. 39, the tracking or following end 3850 of the actuating rod 3830 begins to impinge on the cam surface 3880. This has the effect of driving the actuating rod 3830 forward or toward the handle 600. Thus, separating the upper and lower cooking surfaces rotates the supporting finger 3800 into an evermore upright position. When the device is fully opened (as shown in FIG. 40), the supporting finger 3800 is full extended. An extension 3890 (see FIG. 50) of the upper cooking surface 110 comes to rest on and is supported by the finger 3800. In this way, the action of the supporting finger 3800 together with the limits provided by the tracking arm prevent any rotation of the upper cooking surface 110 about the pivots 205.

Lower Cooking Surface Tilt Mechanism

FIGS. 41-43 illustrate a preferred embodiment of the invention in which the lower cooking surface is tilt adjustable. Tilt adjustments of the lower cooking surface 104 allows the user to select between orientations where liquid run off is promoted or where the run off rate is de-emphasized in favour of a level cooking. A level surface may be more convenient where the user does not want food that rolls or flows to migrate toward the front edge of the lower cooking surface 104.

As shown in FIG. 41, the front of the toaster grill 100 comprises a control panel 4100. An actuator such as a knob 4110 on the control panel is used to rotate a crank 4120 that has an extension 4130 that connects to a coupling or control arm 4140. The other end of the control arm 4150 attaches to a pivot location 4160 located toward the front on the underside 4170 of the lower cooking surface 104. Thus, rotation of the tilt adjustment control knob 4100 has the effect of raising and lowering the front edge 4180 of the lower cooking surface 104. FIG. 42 illustrates the lower cooking surface 104 in a tilted position where the front edge 4180 is lower than the rear edge 4200. FIG. 43 shows that rotation of the control knob 4110 has caused a lifting of the front edge 4180 so that the surface (or rib tops) is approximately level.

Thermostat Linkage

In preferred embodiments of the invention, an adjustable thermostat is mounted directly to the underside of the lower cooking surface 104. So that this adjustable thermostat may be used or operated with a control knob located on the control panel 4100, a mechanical linkage or coupling is required. FIGS. 44 and 45 illustrate such a linkage. As shown in these figures, a control knob 4500 on the control panel 4100 is attached to a stub shaft 4400 that passes through the control panel 4100. The distal end of the control shaft 4400 comprises a coupling portion 4410 that attaches to ball 4420 having retaining stubs 4430 that are snapped into cooperating grooves 4440 located in the stub shaft's coupling portion 4410. The ball 4420 is part of a floating shaft 4450 having a similar ball arrangement 4460 at the other end. The second ball and stub arrangement 4460 is retained by a second coupling portion 4470 which has a bore 4480 for receiving the control shaft 4520 of the thermostat 4530.

Drip Control

As mentioned, the toaster grill of the present invention is adapted for toasting and grilling. Toasting, for example of sandwiches, occurs at a cooking temperature of about 180° C. Grilling of meats occurs at temperatures of about 230° C. Higher temperature cooking, particularly of meats, results in a release of fats and juices from the meat. Further, cooking at higher temperatures may also require the use of cooking oils. Therefore, it is important to provide features for removing and collecting excess cooking liquids from the cooking surfaces. FIG. 46 specifically illustrates an important relationship between the upper and lower cooking surfaces 110, 104. In this illustration, the toaster grill 100 is depicted in the intermediate orientation. Note that the elevated rim of the lower edge 4610 of the upper cooking surface 110 is located above a portion of the lower cooking surface 104. This means that any cooking liquids dripping from the lower edge 4610 fall onto and are collected by the lower cooking surface 104. Also shown in this view is a transverse gutter 4620 that extends along the lower edge of the upper cooking surface 110. This gutter is surrounded by an elevated rim and leads into the discharge spout 230 (better seen in FIGS. 2, 49 and 50). As previously mentioned, the action of the track arm 928 prevents the undesirable rotation of the upper cooking assembly 109 in the direction of the arrow 4630. Because of the rim 4640 along the rear edge of the lower cooking surface 104, liquids discharged from the upper cooking surface are eventually discharged through the lower cooking surface's front spout 105 into the drip collection tray 106.

As shown in FIG. 47, when the upper housing 109 is in the grill orientation a slight inclination forward of the drainage surface below the rib tops, results in a discharge of cooking liquids through the discharge spout 230 into the rear 4710 of the drip collection tray 106. In this way, drippings may be collected at the rear of the tray 4710 from the top spout 230 as well as into the front of the tray 4720 from the lower spout 105.

FIG. 48 illustrates that the drip collection tray 106 can be removed from the toaster grill 100 by sliding it horizontally out of the lower housing. Note that a bumper 4810 serves to limit the travel of the tray 106 and correctly positions it so that it can collect from both spouts 230, 105. The bumper 4810 may cooperate with a cooperating shoulder 4820 formed into the lower rear corner of the tray 106.

Details of Upper Cooking Surface

As shown in FIGS. 49 and 50, the upper cooking surface 110 preferably comprises an aluminium casting which is coated with a non-stick material. In preferred embodiments, the upper cooking surface 110 carries a number of parallel ribs 4910 which are generally parallel with the sides of the toaster grill 100. In particularly preferred embodiments and as shown in FIG. 49, the ribs are tapered, being slightly higher at their fronts 4920 than at their rears 4930. This allows the tips 4940 to remain generally horizontal when the surface is in the grilling orientation while still providing drainage toward the spout area 230 of the inclined surface that occupies the space 4950 between and around the ribs 4910. Where the lower cooking surface 104 is provided with ribs, it is preferred that this same arrangement be maintained, that is, ribs that taper toward a maximum height adjacent to the spout area and that the rib tips or tops remain generally horizontal subject to the tilt action described in FIGS. 41-43.

Adjustment Handle

As shown in FIG. 51, the upper cooking surface 109 has a front edge 5110 to which a handle 130 is attached. In preferred embodiments, the handle is attached from the obverse side of the front face 5110 by one or more fasteners 5120. In this example, the handle 130 includes spacers 5130 that maintain a slight air gap between the front face 5110 and the handle 130. The handle allows the tilt angle of the upper housing 109 to be adjusted, even when it is hot.

Circuit Configurations

Figure 52:
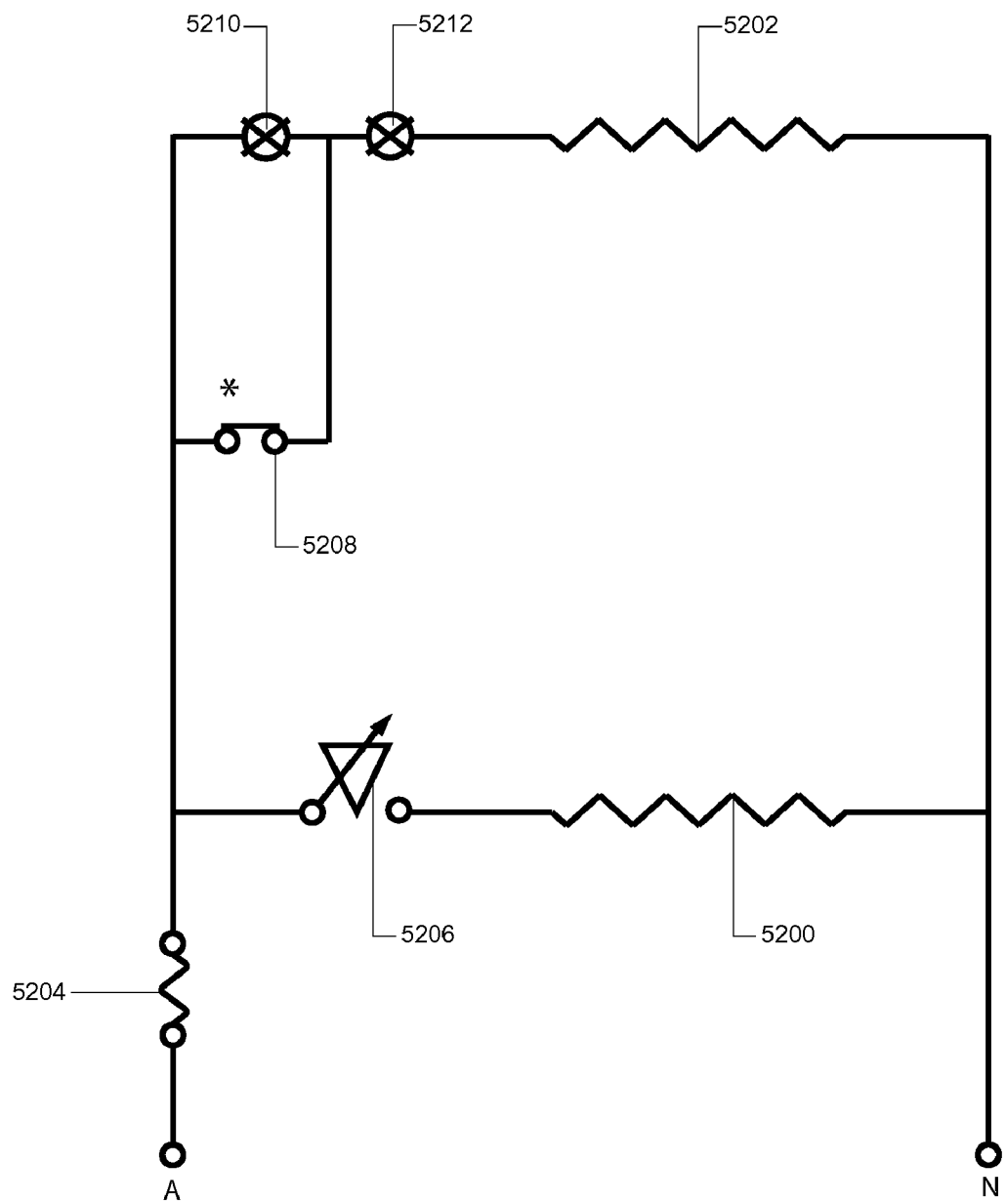

A first circuit diagram for a combination sandwich press and grill 100 is shown in FIG. 52. As shown by the circuit diagram of FIG. 52, the electrical circuit includes a base plate heating element 5200 and a top plate-heating element 5202. The base plate-heating element 5200 is preferably an 1100 W/240V element and the top element 5202 is preferably a 5200 W/240V. A thermal fuse 5204 prevents the device from over heating. A user controlled, variable thermostat 206 provides an operating range of about 180 C to 220 C. When the variable thermostat 5206 reaches an operating temperature of 200 C, a remote micro switch 5206 bypasses the 200 C fixed thermostat 5210 of the top heating element in favour of a 220 C fixed thermostat 5212.

Figure 53:
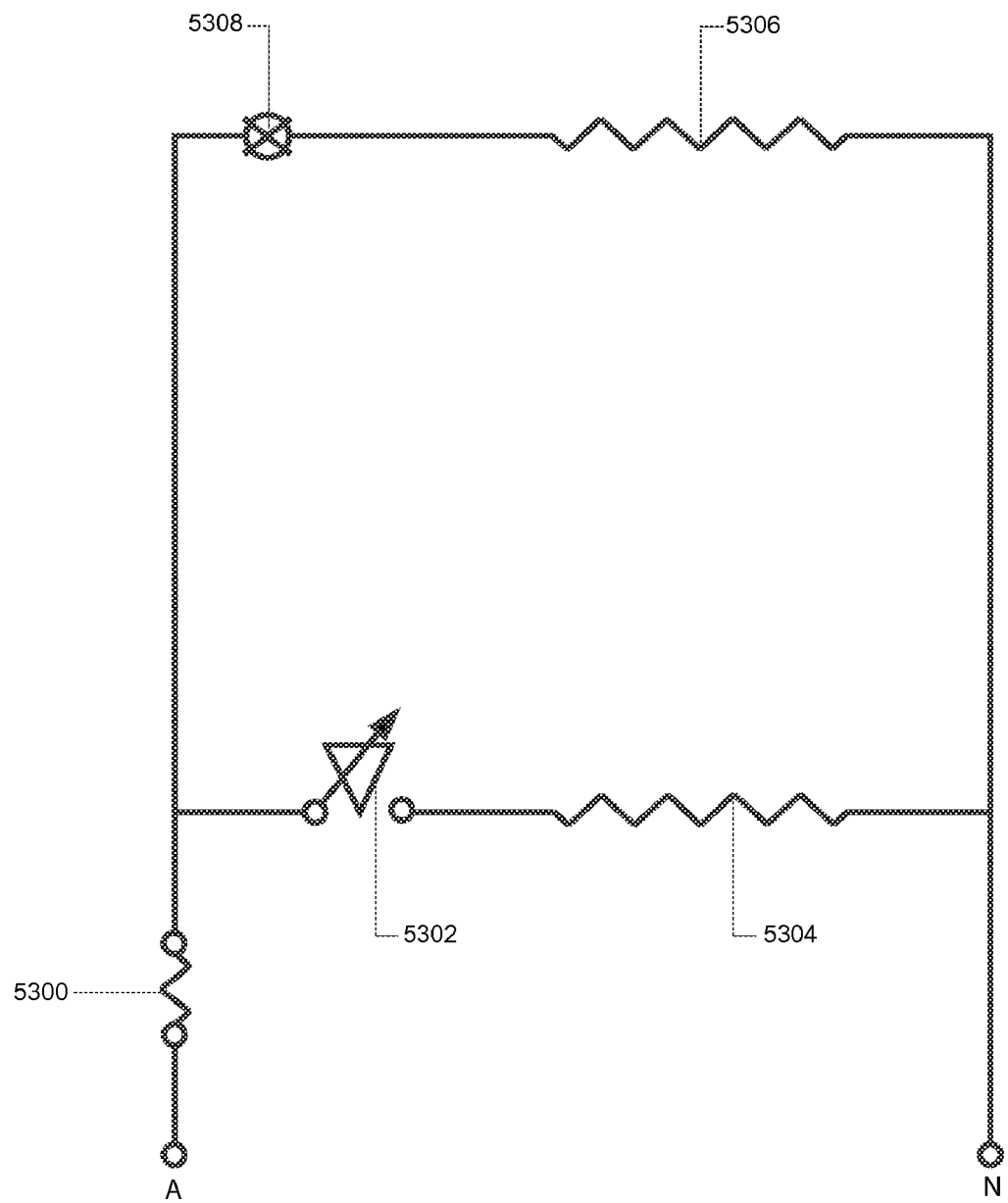

Another embodiment of the invention utilises the circuitry depicted in FIG. 53. In this embodiment, the circuitry includes a thermal fuse 5300 and a single 180/220 C variable thermostat 5304. Note that the variable thermostat 5302 controls only the base plate-heating element 5304, which is preferably an 1100 W/240V type element. The top plate-heating element 5306 is preferably a 1300 W/240V heating element that is regulated by a single 200 C fixed thermostat 5308.

Figure 54:
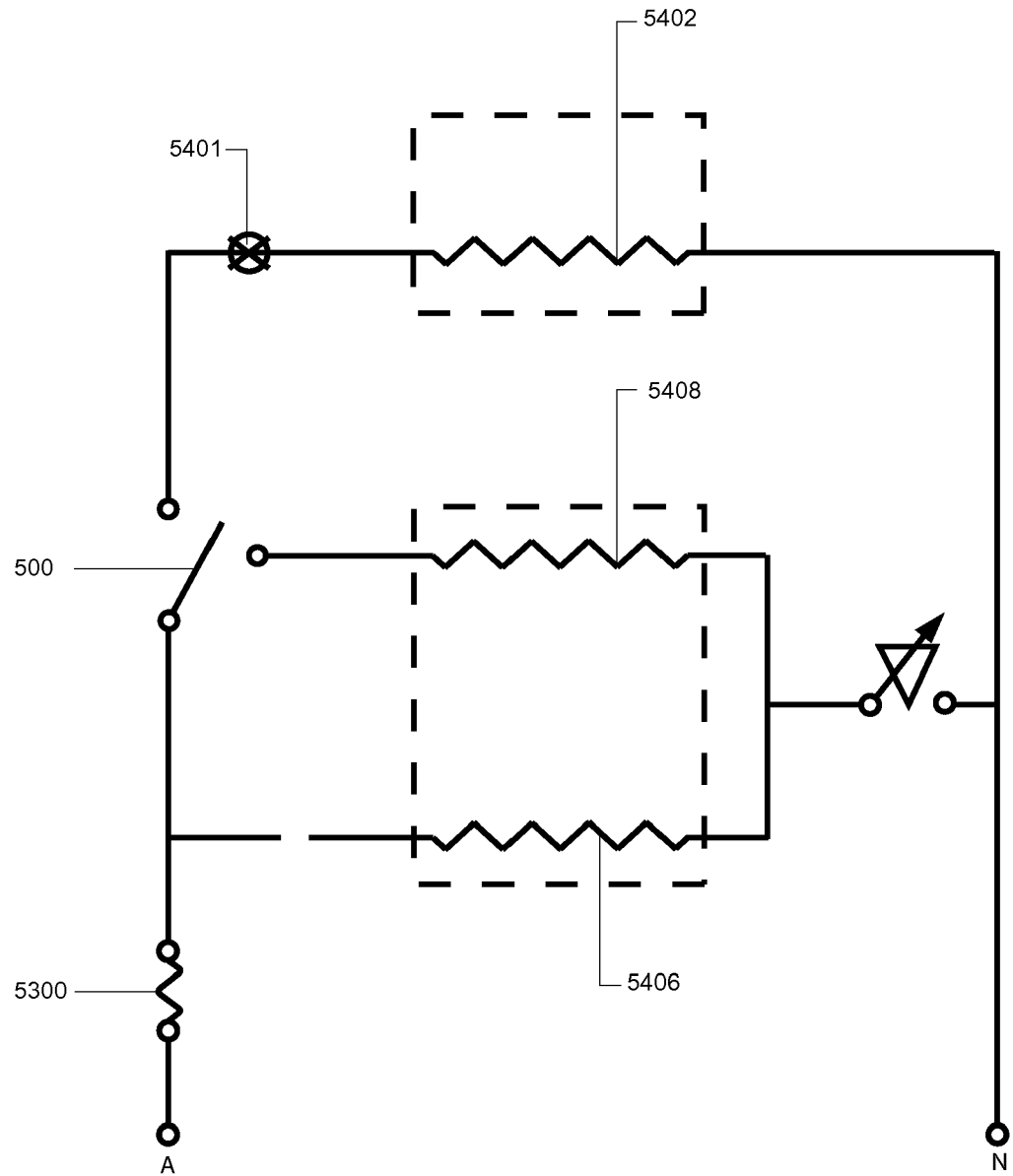

As shown in FIG. 54, a third embodiment of the invention incorporates an electronic circuit incorporating a user activated switch 5400 which allows for the disconnection of the top heating element 5402. The top-heating element 5402 is preferably a 1300 W/240 V element that is regulated by a single 200 C fixed thermostat 5404. The same user activated switch 5400 allows for power to be supplied to either of two base plate-heating elements 5406, 5408. The first heating element 5406 is an 1100 W/240 V element where as the second base plate element 5408 is a 1300 W/240 V element. Both base plate elements 5406, 5408 are regulated by a 180/220 C variable thermostat 5410.

Figure 55:
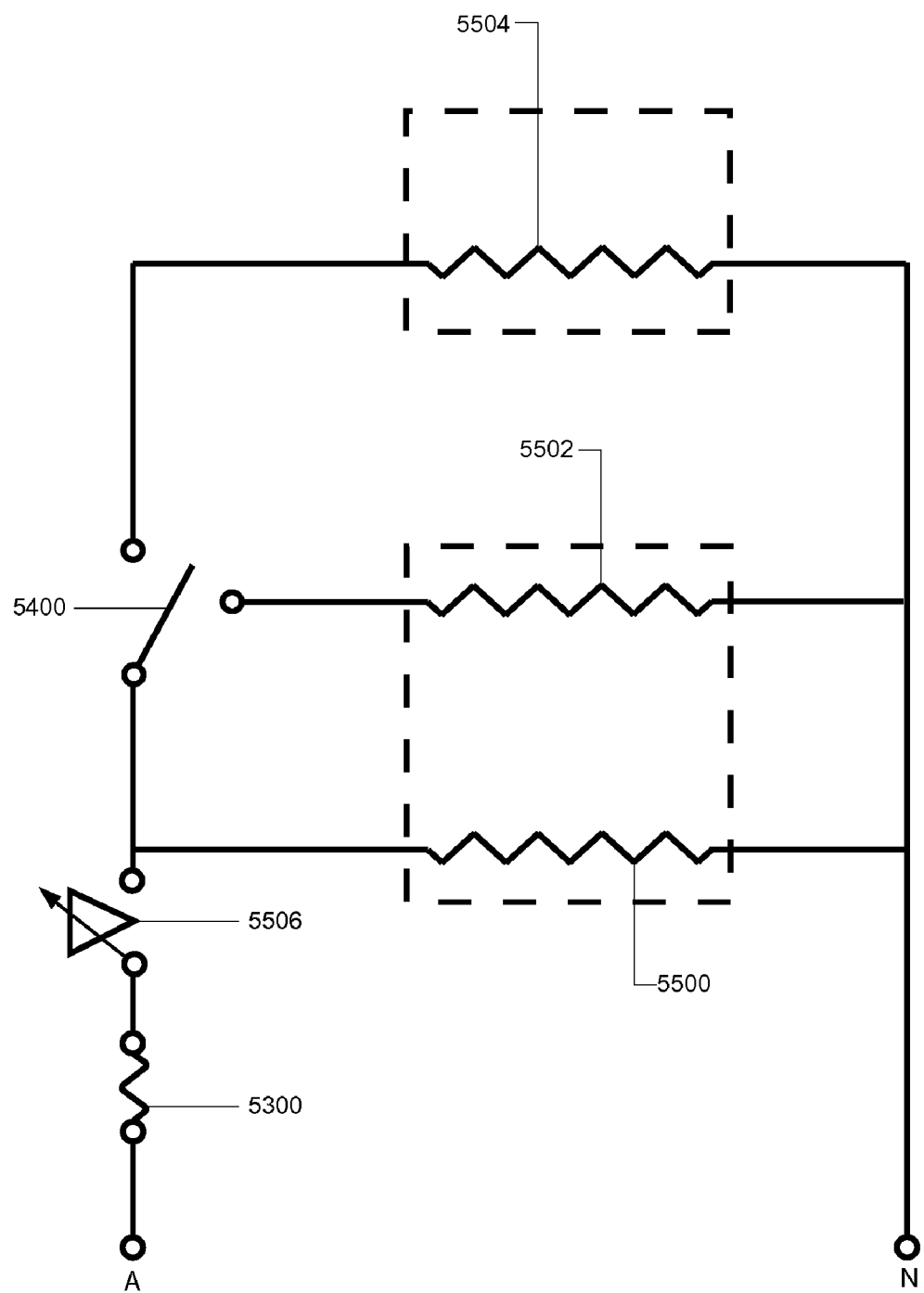

A fourth embodiment is depicted in FIG. 55. In this embodiment, base plate heating elements 5500, 5502 as well as the top plate-heating element 5504 are regulated by a 180/220 C variable thermostat 5506. This embodiment also allows the user to selectively activate or deactivate the top plate cooking element 5504 (with the switch 5400) while at the same time selecting between one or both base plate heating elements 5500, 5502. In this embodiment, the first base plate-heating element 5500 is preferably 1100 W/240 V and the second base plate-heating element 5502 is preferably 1300 W/240 V. The top plate element 5504 is preferably 1300 W/240 V.

Figure 56:
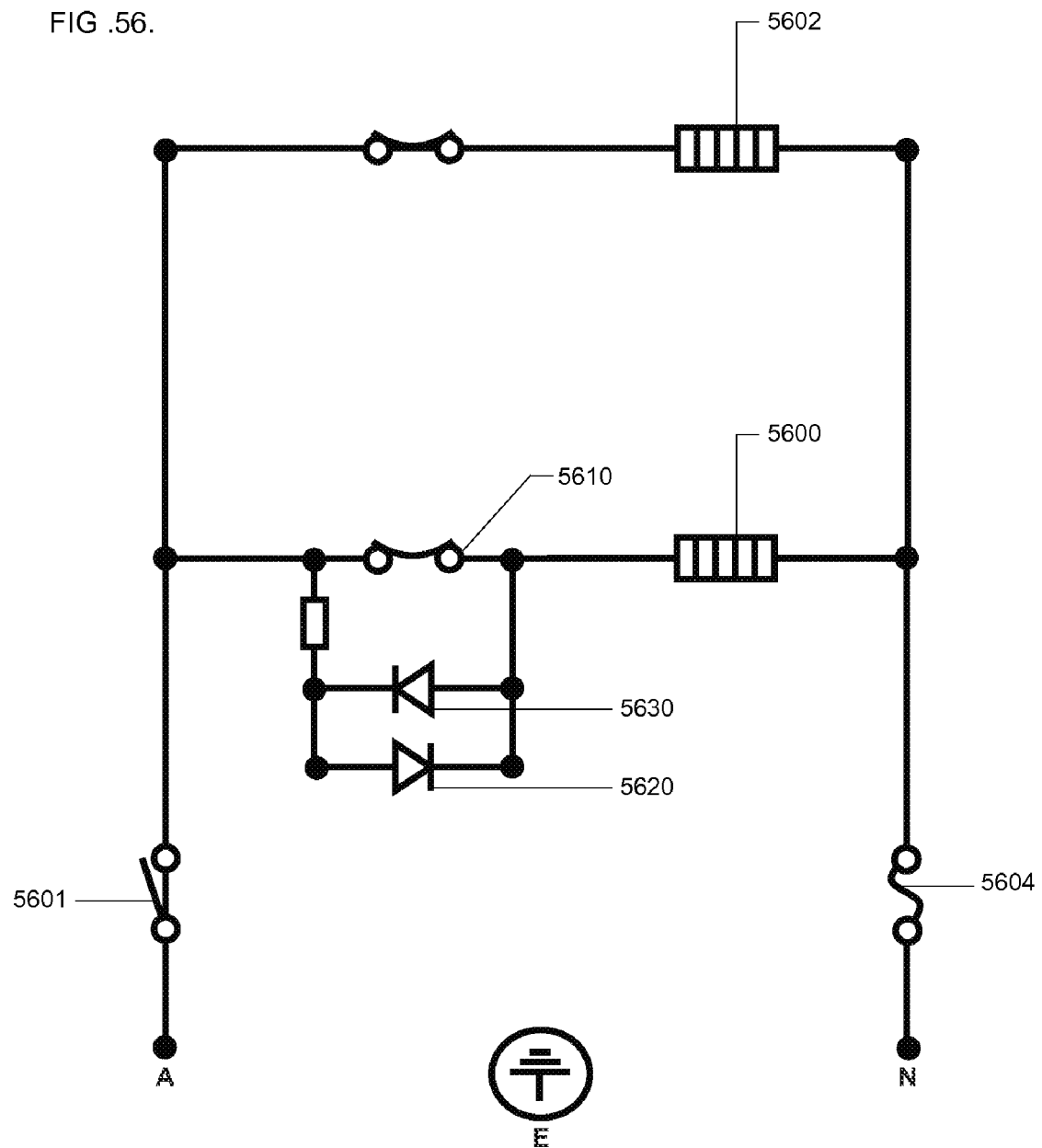

A fifth and preferred circuit diagram for a combination sandwich press and grill 100 is shown in FIG. 56. As shown by the circuit diagram of FIG. 56, the electrical circuit includes a 15A main switch 5601, a base plate heating element 5600 and a top plate heating element 5602 in parallel with the base plate. The base plate and the top heating elements 5200, 5206 are both preferably 1200 W/240V. A thermal fuse 5204 in series with both plates prevents the device from over heating. A single user controlled, variable thermostat 5610 mounted on the lower plate provides a lower plate operating range of about 180 C to 230 C. A green LED 5620 indicates that the power is on. A red or other LED 5630 indicates that the bottom variable thermostat 5610 has reached the correct temperature and is ready for cooking. The top plate is controlled by a fixed thermostat 5650 set to about 235 C. This embodiment dispenses with the need for a top element variable thermostat. During toasting operations the higher temperature of the top element is moderated because the top cooking surface 110 has ribs 4910.

While the present invention has been described with reference to particular examples, embodiments and details of construction, these should be understood as having been provided by way of example and not as limitations to the scope of spirit or the invention.

What is claimed is:

1. A combination sandwich press and grill device having a lower housing with a lower cooking surface and an upper housing with an upper cooking surface wherein:
    the device is adapted to function as a sandwich toasting press and a meat grill and can open from a fully closed position to a full open grill position;
    the upper housing is supported by a U shaped frame having two side arms and a cross-piece that serves as a handle, each side arm of the U shaped frame having a pivot for supporting the upper housing, the handle adapted to make contact with a bench or counter top so as to support the upper housing in the open grill configuration;
    the upper cooking surface having ribs that are parallel with the sides of the device, the lower cooking surface not having ribs;
    the ribs being tapered, being higher at a front than at a rear, this allowing a tip of a rib to remain generally horizontal while still providing drainage of an inclined surface that occupies a space between and around the ribs;
    the U shaped frame being hinged to the lower cooking surface and having an intermediate and locked orientation;
    the lower cooking surface being tilt adjustable, allowing the user to select between an orientation where a liquid run off is promoted and an orientation where the run off is de-emphasized in favour of a level cooking surface;
    the run off is deposited into a full length drip tray from a front of the lower cooking surface and a front of the upper cooking surface;
    the drip tray carried within the lower housing.

2. The device of claim 1, wherein:
    the upper housing and the upper cooking surface are restrained from pivoting when in the full open grill position.

3. The device of claim 1, wherein:
    a front of the drip tray collects from a front of the lower cooking surface and a rear of the drip tray collects from a front of the upper cooking surface.

4. The device of claim 1, wherein:
    a hinge mechanism for establishing the intermediate and locked orientation is at least partially concealed within a hinge between the U shaped frame and the lower cooking surface.

5. A combination sandwich press and grill device having a lower housing with a lower cooking surface and an upper housing with an upper cooking surface wherein:
    the device is adapted to function as a sandwich toasting press and a meat grill and can open from a fully closed position to a full open grill position;
    the upper housing is supported by a U shaped frame having two side arms and a handle, each side arm of the U shaped frame having a pivot for supporting the upper housing, the handle acting as a foot in the open grill configuration;
    the upper cooking surface having parallel ribs that are parallel with the sides of the device, the lower cooking surface not having ribs;
    the ribs being tapered, being higher at a front than at a rear, this allowing a tip of a rib to remain generally horizontal while still providing drainage of an inclined surface that occupies a space between and around the ribs;
    the U shaped frame being hinged to provide an intermediate and locked orientation that can be defeated so that the device can be opened to a fully open grill orientation;
    the hinge mechanism, once having been defeated, adapted to be reset without further intervention when the user closes the device, so that a subsequent attempt to open the unit encounters the intermediate and locked orientation;
    the lower cooking surface being tilt adjustable, allowing the user to select between an orientation where a liquid run off is promoted and an orientation where a run off rate is de-emphasized in favour of a level cooking surface;
    the run off is collected from a front of the lower cooking surface and a front of the upper cooking surface by a drip tray that is carried by the lower housing.

6. The device of claim 5, wherein:
    the upper housing and the upper cooking surface are restrained from tilting when in the full open grill position.

7. The device of claim 5, wherein:
    the drip tray is a full length drip tray and the run off is collected from the front of the upper cooking surface when the upper cooking surface is in a full open grill orientation.

8. The device of claim 5, wherein:
    the hinge mechanism for establishing the intermediate and locked orientation is at least partially concealed within a hinge located between the U shaped frame and the lower cooking surface.

9. The device of claims 1, wherein:
    a tilt adjustment for the lower cooking surface comprises a rotating knob on a control panel of the lower housing.

10. A combination sandwich press and grill device having a lower housing with a lower cooking surface and an upper housing with an upper cooking surface wherein:
    the device is adapted to function as a sandwich toasting press and a meat grill and can open from a fully closed position to a full open grill position;
    the upper housing is supported by a U shaped frame having two side arms and a cross-piece that serves as a handle, each side arm of the U shaped frame having a pivot for supporting the upper housing, the handle adapted to make contact with a bench or counter top so as to support the upper housing in the open grill configuration;
    the upper cooking surface having ribs;
    the U shaped frame being hinged to the lower cooking surface and having an intermediate and locked orientation;
    the lower cooking surface being tilt adjustable, allowing the user to select between an orientation where a liquid run off is promoted and an orientation where the run off is de-emphasized in favour of a level cooking surface; and
    the run off is deposited into a drip tray.

11. The device of claim 10, wherein:
    the ribs are tapered, being higher at a front than at a rear, this allowing a tip of a rib to remain generally horizontal while still providing drainage of an inclined surface that occupies a space between and around the ribs.

12. The device of claim 10, wherein:
    a front of the drip tray collects from a front of the lower cooking surface and a rear of the drip tray collects from a front of the upper cooking surface.

13. The device of any one of claims 1, 5 or 10, wherein:
the lower cooking plate has rear corners and the U shaped frame is hinged to the rear corners.

14. The device of any one of claims 1, 5 or 10, wherein:
the handle is curved.

15. The device of any one of claims 1, 5 or 10, wherein:
a mechanism allows the upper and lower housings to be locked together for storage purposes.

16. The device of claim 10, wherein:
the variable thermostat is controlled by a rotating knob located on a control panel on the lower housing.

17. The device of any one of claims 1, 5 or 10, wherein:
the upper housing and the upper cooking plate can be spaced apart from and above the lower cooking plate in a number of discreet steps.

* * * * *